US012580180B2

(12) United States Patent
Kapylou et al.

(10) Patent No.: US 12,580,180 B2
(45) Date of Patent: Mar. 17, 2026

(54) COMPOSITE CATHODE ACTIVE MATERIAL, CATHODE AND LITHIUM BATTERY CONTAINING COMPOSITE CATHODE ACTIVE MATERIAL AND PREPARATION METHOD THEREOF

(71) Applicant: SAMSUNG SDI CO., LTD., Yongin-si (KR)

(72) Inventors: Andrei Kapylou, Yongin-si (KR); Jongseok Moon, Yongin-si (KR); Inhyuk Son, Yongin-si (KR); Guesung Kim, Yongin-si (KR); Denis Chernyshov, Yongin-si (KR); Sangkook Mah, Yongin-si (KR); Sungnim Jo, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 928 days.

(21) Appl. No.: 17/657,579

(22) Filed: Mar. 31, 2022

(65) Prior Publication Data

US 2022/0320498 A1 Oct. 6, 2022

(30) Foreign Application Priority Data

Apr. 1, 2021 (KR) ........................ 10-2021-0042810

(51) Int. Cl.
*H01M 4/36* (2006.01)
*H01M 4/505* (2010.01)
(Continued)

(52) U.S. Cl.
CPC ........... *H01M 4/366* (2013.01); *H01M 4/505* (2013.01); *H01M 4/525* (2013.01); *H01M 4/625* (2013.01);
(Continued)

(58) Field of Classification Search
None
See application file for complete search history.

(56) References Cited

U.S. PATENT DOCUMENTS 9,093,711 B2 7/2015 Sheem et al.
10,249,871 B2 4/2019 Son et al.
(Continued)

FOREIGN PATENT DOCUMENTS

CN 105895879 A 8/2016
CN 105958055 A 9/2016
(Continued)

OTHER PUBLICATIONS

Extended European Search Report issued Aug. 26, 2022, in corresponding EP Patent Application No. 22166146.5 (8 pages).
(Continued)

*Primary Examiner* — Zhongqing Wei
(74) *Attorney, Agent, or Firm* — Womble Bond Dickinson (US) LLP

(57) ABSTRACT

A composite cathode active material, a cathode including the same, a lithium battery, and a method of preparing a composite cathode active material are provided. The composite cathode active material includes: a core including a lithium transition metal oxide; and a shell disposed on and conforming to a surface of the core The shell includes: at least one first metal oxide represented by formula $MaOb$ ($0<a\leq3$ and $0<b<4$, and if a 1, 2, or 3, b is not an integer); a carbonaceous material; and a doped fluorine (F) element, and the first metal oxide is disposed in a carbonaceous material matrix, and M is at least one metal selected from among Group 2 to Group 13, Group 15, and Group 16 metals in the Periodic Table.

14 Claims, 2 Drawing Sheets

(51) Int. Cl.

| | |
|---|---|
| *H01M 4/525* | (2010.01) |
| *H01M 4/62* | (2006.01) |
| *H01M 10/0525* | (2010.01) |
| *H01M 4/02* | (2006.01) |

(52) U.S. Cl.

CPC .. *H01M 10/0525* (2013.01); *H01M 2004/021* (2013.01); *H01M 2004/028* (2013.01)

(56) References Cited

U.S. PATENT DOCUMENTS

| | | | |
|---|---|---|---|
| 11,011,746 B2 | 5/2021 | Park et al. | |
| 11,302,904 B2 | 4/2022 | Kim et al. | |
| 2009/0146111 A1 | 6/2009 | Shin et al. | |
| 2009/0155694 A1 | 6/2009 | Park | |
| 2011/0165463 A1 | 7/2011 | Chang et al. | |
| 2013/0164624 A1* | 6/2013 | Sheem | H01M 4/587 |
| | | | 427/78 |
| 2014/0255500 A1 | 9/2014 | Son et al. | |
| 2015/0037680 A1 | 2/2015 | Park et al. | |
| 2015/0093648 A1 | 4/2015 | Son et al. | |
| 2015/0243969 A1 | 8/2015 | Ku et al. | |
| 2015/0380728 A1 | 12/2015 | Son et al. | |
| 2017/0018767 A1 | 1/2017 | Park et al. | |
| 2017/0084920 A1 | 3/2017 | Sawai et al. | |
| 2017/0187070 A1 | 6/2017 | Park et al. | |
| 2017/0279109 A1 | 9/2017 | Wang | |
| 2018/0083272 A1 | 3/2018 | Son et al. | |
| 2018/0277839 A1 | 9/2018 | Luo et al. | |
| 2021/0376314 A1* | 12/2021 | Son | H01M 4/366 |

FOREIGN PATENT DOCUMENTS

| | | | |
|---|---|---|---|
| CN | 106356507 A | 1/2017 | |
| CN | 107004918 A | 8/2017 | |
| CN | 109830654 A | 5/2019 | |
| CN | 112151742 A | 12/2020 | |
| EP | 2854204 A1 | 4/2015 | |
| EP | 3118916 A1 | 1/2017 | |
| JP | 2005-174655 A | 6/2005 | |
| JP | 2009-152197 A | 7/2009 | |
| JP | 2013-206553 A | 10/2013 | |
| JP | 2015-228290 A | 12/2015 | |
| JP | 2018-006156 A | 1/2018 | |
| JP | 2018-098161 A | 6/2018 | |
| JP | 2018-533174 A | 11/2018 | |
| KR | 10-2012-0014498 A | 2/2012 | |
| KR | 10-2013-0040541 A | 4/2013 | |
| KR | 10-2013-0073461 A | 7/2013 | |
| KR | 10-2015-0039555 A | 4/2015 | |
| KR | 10-2015-0101310 A | 9/2015 | |
| KR | 10-2015-0141473 A | 12/2015 | |
| KR | 10-2015-0141924 A | 12/2015 | |
| KR | 2017-0008164 A | 1/2017 | |
| KR | 10-2017-0076485 A | 7/2017 | |
| KR | 10-2018-0031585 A | 3/2018 | |
| KR | 2018-0116928 A | 10/2018 | |
| KR | 10-2019-0083613 A | 7/2019 | |
| KR | 10-2019-0091411 A | 8/2019 | |
| KR | 10-2020-0000850 A | 1/2020 | |
| KR | 10-2020-0015685 A | 2/2020 | |
| KR | 10-2093441 B1 | 3/2020 | |
| KR | 10-2020-0058644 A | 5/2020 | |
| KR | 10-2022-0020850 A | 2/2022 | |

OTHER PUBLICATIONS

Hu, Guorong et al., "Surface-fluorinated $Li_4TisO_{12}$ nanowires/reduced graphene oxide composite as a high-rate anode material for Lithium ion batteries", Applied Surface Science 479 (2019) pp. 158-166 (9 pages).

Son, In Huuk et al., "Graphene balls for lithium rechargeable batteries with fast charging and high volumetric energy densities", Nature Communications (2017) 8:1561; DOI: 10.1038/s41467-017-01823-7 (11 pages).

Japanese Office Action issued Apr. 3, 2023, in corresponding JP Patent Application No. 2022-58914 (4 pages).

Liu, Siyu et al., "Fluorine Doping and Al2O3 Coating Co-modified Li[Li0.20Ni0.133Co0.133Mn0.534]O2 as High Performance Cathode Material for Lithium-Ion Batteries", Journal of Alloys and Compounds Jan. 15, 2018, 636-645 (18 pages).

Chinese Office Action issued Mar. 17, 2025, in corresponding CN Patent Application No. 202210356951.7 (9 pages).

European Official Communication dated Oct. 15, 2025 for corresponding EP Patent Application No. 22166146.5, 6 pages.

* cited by examiner

COMPOSITE CATHODE ACTIVE MATERIAL, CATHODE AND LITHIUM BATTERY CONTAINING COMPOSITE CATHODE ACTIVE MATERIAL AND PREPARATION METHOD THEREOF

CROSS-REFERENCE TO RELATED APPLICATION

This application claims priority to and the benefit of Korean Patent Application No. 10-2021-0042810, filed on Apr. 1, 2021, in the Korean Intellectual Property Office, the entire content of which is hereby incorporated by reference herein.

BACKGROUND

1. Field

One or more embodiments of the present disclosure are directed to a composite cathode active material, a cathode and a lithium battery, employing the same, and a method of preparing the same.

2. Description of the Related Art

As one or more suitable devices are increasingly miniaturized and have higher performance, it is increasingly important that lithium batteries have higher energy densities in addition to miniaturization and weight reduction. For example, lithium batteries having a high capacity are increasingly important.

To realize a lithium battery suitable for the above purpose, a cathode active material having high capacity is being studied.

Nickel-based cathode active materials, due to side reactions, show diminished lifetime characteristics and unsatisfactory (unsuitable) thermal stability.

Accordingly, there is a need for a method for preventing or reducing degradations in battery performance, while including a nickel-based cathode active material.

SUMMARY

One aspect of an embodiment of the present disclosure is directed to a composite cathode active material which suppresses (or reduces) side reactions of the composite cathode active material and improves reversibility of electrode reactions, and thereby prevents (reduces) degradations in lithium performance.

Another aspect of an embodiment of the present disclosure is directed to a cathode that includes the composite cathode active material.

Another aspect of an embodiment of the present disclosure is directed to a lithium battery employing the cathode.

Another aspect of an embodiment of the present disclosure is directed to a method of preparing the composite cathode active material.

Additional aspects of embodiments of the present disclosure will be set forth in part in the description which follows and, in part, will be apparent from the disclosure, or may be learned by practice of the presented embodiments of the disclosure.

According to an embodiment of the present disclosure, a composite cathode active material includes: a core including a lithium transition metal oxide; and a shell disposed on and conforming to a surface of the core, wherein the shell includes: at least one first metal oxide represented by formula $M_aO_b$ ($0<a\leq3$ and $0<b<4$, and when a 1, 2, or 3, b is not an integer); a carbonaceous material; and a doped fluorine (F) element, and the first metal oxide is disposed in a carbonaceous material matrix, and M is at least one metal selected from among Group 2 to Group 13, Group 15, and Group 16 metals in the Periodic Table.

According to another embodiment of the present disclosure, a cathode includes the composite cathode active material. According to an embodiment of the present disclosure, a lithium battery includes the cathode, an anode, and an electrolyte disposed between the cathode and the anode.

According to an embodiment of the present disclosure, a method of preparing a composite cathode active material includes: providing a lithium transition metal oxide; providing a composite; and mechanically milling the lithium transition metal oxide and the composite, wherein the composite includes: at least one first metal oxide represented by formula $M_aO_b$ ($0<a\leq3$ and $0<b<4$, and when a is 1, 2, or 3, b is not an integer); a carbonaceous material; and a doped fluorine (F) element, wherein the first metal oxide is disposed within a carbonaceous material matrix, and M is at least one metal selected from Groups 2 to 13, Group 15, and Group 16 metals in the Periodic Table.

BRIEF DESCRIPTION OF THE DRAWINGS

The above and other aspects and features of certain embodiments of the disclosure will be more apparent from the following description taken in conjunction with the accompanying drawings, in which.

REFERENCE NUMERALS IN THE DRAWINGS

Figure 1:
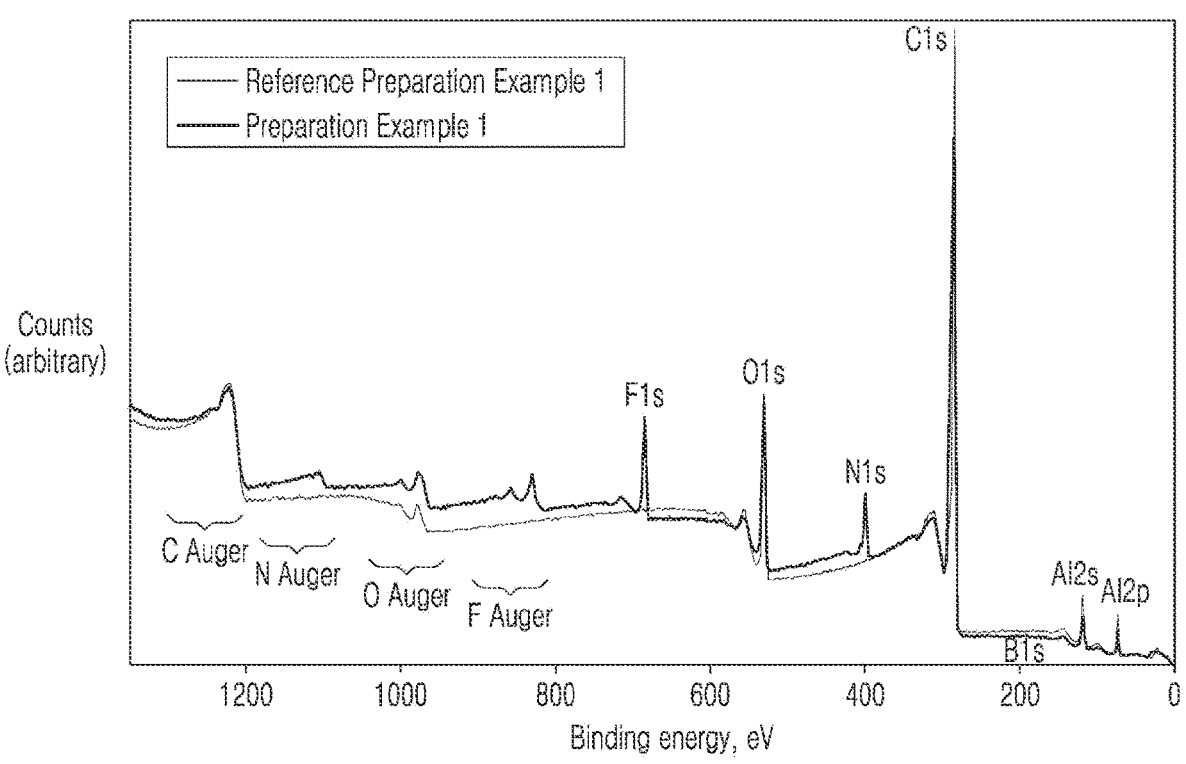
FIG. 1 shows X-ray photoelectron spectroscopy (XPS) spectrums of an undoped composite prepared in Reference Preparation Example 1 and a fluorine (F)-doped composite prepared in Preparation Example 1.

1: Lithium battery 2: Anode
3: Cathode 4: Separator
5: Battery case 6: Cap assembly

DETAILED DESCRIPTION

Reference will now be made in more detail to embodiments, examples of which are illustrated in the accompanying drawings, wherein like reference numerals refer to like elements throughout, and duplicative descriptions thereof may not be provided. In this regard, the present embodiments may have different forms and should not be construed as being limited to the descriptions set forth herein. Accordingly, the embodiments are merely described, by referring to the drawings, to explain aspects of embodiments of the present disclosure. As utilized herein, the term "and/or" includes any and all combinations of one or more of the associated listed items. Expressions such as "at least one of," when preceding a list of elements, modify the entire list of elements and do not modify the individual elements of the list.

The present disclosure may have one or more suitable modifications and one or more suitable embodiments, and will be described in greater details in conjunction with specific embodiments illustrated in the drawings. The present disclosure, however, should not be construed as limited to the example embodiments set forth herein, and rather, should be understood as covering all modifications, equivalents, or alternatives falling within the scope of the present disclosure.

The terms used herein are for the purpose of describing particular embodiments only, and are not intended to be limiting the present disclosure. As used herein, the singular is intended to include the plural forms as well, unless the context clearly indicates otherwise. It will be further understood that the terms "comprises" and/or "comprising," or "includes" and/or "including" when used in this disclosure, specify the presence of stated features, regions, integers, steps, operations, elements, and/or components, but do not preclude the presence or addition of one or more other features, regions, integers, steps, operations, elements, components, and/or groups thereof. As used herein, "/" may be interpreted as "and", or as "or" depending on the context.

In the drawings, thicknesses may be magnified or exaggerated to clearly illustrate one or more suitable layers and regions. Like reference numbers may refer to like elements throughout the drawings and the following description, and duplicative descriptions thereof may not be provided. It will be understood that when one element, layer, film, section, sheet, etc. is referred to as being "on" or "above" another element, it can be directly on the other element or intervening elements may be present therebetween. Although the terms "first," "second," etc. may be used herein to describe one or more suitable elements, these elements should not be limited by these terms. These terms are only used to distinguish one element from another element.

According to examples, a composite cathode active material, a cathode and a lithium battery including the same, and a method of preparing the same will be described in more detail.

The composite cathode active material may include: a core including a lithium transition metal oxide; and a shell disposed on and conforming to a surface of the core, wherein the shell includes: at least one first metal oxide represented by formula $M_aO_b$ ($0<a\leq3$ and $0<b<4$, and when a 1, 2, or 3, b is not an integer); a carbonaceous material; and a doped fluorine (F) element, and the first metal oxide is disposed in a carbonaceous material matrix, and M is at least one metal selected from among Group 2 to Group 13, Group 15, and Group 16 metals in the Periodic Table.

Theoretical grounds on which a composite cathode active material according to an example may provide excellent or suitable effects will be described, but this is only to assist the understanding of the present disclosure and should not be construed as limiting the present disclosure.

A shell including a first metal oxide, a carbonaceous material, and fluorine (F) element may be disposed on a core of the composite cathode active material. The fluorine (F) element included in the shell may be fluorine (F) element doped in the shell. The fluorine (F) element doped in the shell may form a chemical bond with the first metal oxide and/or the carbonaceous material included in the shell. The fluorine (F) element doped in the shell may be distinguished from fluorine (F) element physically disposed in the periphery of the composite cathode active material. The fluorine (F) element doped in the shell may be, for example, distinguished from fluorine (F) element disposed in the periphery of the composite cathode active material by mixing of the composite cathode active material with a fluorine (F)-containing compound or a composition containing the same (for example, a binder, a conductor, a liquid electrolyte, etc.). The fluorine (F) atom has a lower electronegativity than the carbon (C) atom and thus increases electrochemical reactivity and electrical conductivity. As a result, in a shell containing the carbonaceous material as a main component, the C—F bonds between the fluorine atoms and the carbonaceous material, for example, facilitate conduction of electrons and ions. Therefore, electrochemical absorption and release of high-density energy in the composite cathode active material may be facilitated. For example, as the fluorine (F) element is included in the shell, electrons of the fluorine (F) element are added to the $\pi$-electron system of the carbonaceous material, for example, and as a result, density of charge carriers may be increased. Therefore, as the shell includes the doped fluorine (F) element, reversibility of electrode reactions on a surface of the composite cathode active material may increase, and conductivity of the electrode may increase. As a result, cycle characteristics and charge-discharge capacity of a battery including such a composite cathode active material may be improved.

Carbonaceous materials may easily form aggregates and thus are difficult to be evenly coated on the core. In some embodiments, the composite cathode active material, utilizing a carbonaceous material matrix, utilizes a composite including a plurality of first metal oxides disposed therein, and thus may allow a substantially uniform shell to be disposed on the core while preventing or reducing aggregations of the carbonaceous material. Accordingly, as the contact between the core and an electrolyte solution is effectively blocked (or reduced), side reactions caused by contact between the core and the electrolyte may be prevented or reduced. In some embodiments, as cation mixing due to the electrolyte solution may be suppressed or reduced, the formation of resistant layers may be suppressed or reduced. In some embodiments, dissolution of transition metal ions may be suppressed or reduced. The carbonaceous material may be, for example, a crystalline carbonaceous material. The carbonaceous material may be, for example, carbonaceous nanostructures. The carbonaceous material may be, for example, carbonaceous two-dimensional nanostructures. One example of the carbonaceous material may be graphene. In this embodiment, as a shell including graphene and/or a graphene matrix has flexibility, changes in volume of the composite cathode active material during charging and discharging may be easily accommodated, thus suppressing crack formation inside the composite cathode active material. Because graphene has high electron conductivity, the interfacial resistance between the composite cathode active material and an electrolyte solution may be decreased. Accordingly, even with the shell including graphene being introduced therein, the internal resistance of the lithium battery may remain unchanged or decrease.

The carbonaceous material included in the shell of the composite cathode active material may be derived from a graphene matrix, and thus, may have a relatively low density and higher porosity compared to related art carbonaceous materials derived from graphite-based materials. The d002 interplanar distance of the carbonaceous material included in the shell of the composite cathode active material may be, for example, 3.38 Å or more, 3.40 Å or more, 3.45 Å or more, 3.50 Å or more, 3.60 Å or more, 3.80 Å or more, or 4.00 Å or more. The d002 interplanar distance of the carbonaceous material included in the shell of the composite cathode active material may be, for example, about 3.38 Å to about 4.0 Å, about 3.38 Å to about 3.8 Å, about 3.38 Å to about 3.6 Å, about 3.38 Å to about 3.5 Å, or about 3.38 Å to about 3.45 Å. In some embodiments, the d002 interplanar distance of a carbonaceous material derived from a graphite-based material may be, for example, 3.38 Å or less, or about 3.35 Å to about 3.38 Å.

The first metal oxide has withstand-voltage properties (i.e., is able to withstand high voltages) and thus, may prevent or reduce degradations of the lithium transition metal oxide included in the core while charging and discharging at a high voltage. The shell may include, for example, a first metal oxide of a single kind, or first metal oxides of two or more different kinds.

Consequently, a lithium battery including the above-described composite cathode active material may have improved high-rate characteristics, and improved high-temperature and high-voltage cycle characteristics.

In the composite cathode active material, for example, the amount of the shell may be about 0.5 wt % to about 3 wt %, about 0.5 wt % to about 2.5 wt %, about 0.5 wt % to about 2 wt %, or about 0.5 wt % to about 1.5 wt %, with respect to the total weight of the composite cathode active material. In some embodiments, the amount of the first metal oxide may be, for example, about 0.3 wt % to about 1.8 wt %, about 0.3 wt % to about 1.5 wt %, about 0.3 wt % to about 1.2 wt %, or about 0.3 wt % to about 0.9 wt %, with respect to the total weight of the composite cathode active material. As the composite cathode active material includes the shell and the first metal oxide in amounts in the above ranges, the lithium battery may have further improved cycle characteristics. The amount of doped fluorine (F) element included in the shell may be, for example, about 1 at % to about 10 at %, about 1 at % to about 9 at %, about 2 at % to about 9 at %, about 2 at % to about 8 at %, about 3 at % to about 8 at %, about 3 at % to about 7 at %, about 4 at % to about 7 at %, or about 4 at % to about 6 at %, with respect to the total number of atoms of the shell. As the shell is doped with the fluorine (F) element in an amount in the above ranges, a lithium battery including the composite cathode active material may have further improved cycle characteristics. The amount of the doped fluorine (F) element included in the shell can be calculated, for example, from peaks shown on the XPS spectrum measured on a surface of the composite cathode active material.

The amount of a metal in the first metal oxide included in the shell may be, for example, about 1 at % to about 10 at %, about 1 at % to about 9 at %, about 2 at % to about 9 at %, about 2 at % to about 8 at %, about 3 at % to about 8 at %, about 3 at % to about 7 at %, about 4 at % to about 7 at %, or about 4 at % to about 6 at %, with respect to the total number of atoms of the shell. As the shell includes a metal in a first metal oxide in an amount in the above ranges, a lithium battery including the composite cathode active material may have further improved cycle characteristics. The amount of a metal in the first metal oxide included in the shell can be calculated, for example, from peaks shown on the XPS spectrum measured on a surface of the composite cathode active material.

The amount of oxygen (O) included in the shell may be, for example, about 1 at % to 20 at %, about 1 at % to about 18 at %, about 3 at % to about 18 at %, about 3 at % to about 16 at %, about 5 at % to about 16 at %, about 5 at % to about 14 at %, about 7 at % to about 14 at %, or about 7 at % to about 12 at %, with respect to the total number of atoms of the shell. As the shell includes oxygen in an amount in the above ranges, a lithium battery including the composite cathode active material may have further improved cycle characteristics. The amount of oxygen (O) included in the shell can be calculated, for example, from peaks shown on the XPS spectrum of a surface of a composite cathode active material.

The shell may additionally include elements other than fluorine (F), the first metal, and/or oxygen. The other ele-ments additionally included in the shell may be, for example, nitrogen (N), boron (B), and/or the like. The additional other elements may be included in a precursor containing the fluorine (F) element, during the preparation process of the composite cathode active material.

The amount of nitrogen (N) included in the shell may be, for example, about 1 at % to 12 at %, about 2 at % to about 12 at %, about 2 at % to about 11 at %, about 3 at % to about 10 at %, about 4 at % to about 10 at %, about 4 at % to about 9 at %, about 5 at % to about 9 at %, about 5 at % to about 8 at %, or about 5 at % to about 7 at %, with respect to the total number of atoms of the shell. As the shell includes nitrogen in an amount in the above ranges, a lithium battery including the composite cathode active material may have further improved cycle characteristics. The amount of nitrogen (N) included in the shell may be determined or calculated, for example, from peaks shown on the XPS spectrum measured on a surface of the composite cathode active material.

The amount of boron (B) included in the shell may be, for example, more than 0 at % to about 5 at %, about 0.01 at % to about 4 at %, about 0.1 at % to about 3 at %, about 0.1 at % to about 2 at %, about 0.1 at % to about 1.5 at %, or about 0.3 at % to about 1 at %, with respect to the total number of atoms of the shell. As the shell includes boron (B) in an amount in the above ranges, a lithium battery including the composite cathode active material may have further improved cycle characteristics. The amount of boron (B) included in the shell may be determined or calculated, for example, from peaks shown on the XPS spectrum measured on a surface of the composite cathode active material.

The amount of carbon included in the shell may be, for example, about 65 at % to about 99 at %, about 70 at % to about 99 at %, about 75 at % to about 99 at %, about 80 at % to about 99 at %, about 80 at % to about 95 at %, about 80 at % to about 93 at %, about 80 at % to about 91 at %, or about 83 at % to about 90 at %, with respect to the total number of atoms of the shell. As the shell includes carbon in an amount in the above ranges, a lithium battery including the composite cathode active material may have further improved cycle characteristics. The amount of carbon included in the shell may be determined or calculated, for example, from peaks shown on the XPS spectrum of a surface of a composite cathode active material.

A metal included in the first metal oxide may be, for example, at least one metal selected from among Al, Nb, Mg, Sc, Ti, Zr, V, W, Mn, Fe, Co, Pd, Cu, Ag, Zn, Sb, and Se. The first metal oxide may be, for example, at least one selected from among $Al_2O_z$ $(0<z<3)$, $NbO_x$ $(0<x<2.5)$, $MgO_x$ $(0<x<1)$, $Sc_2O_z$ $(0<z<3)$, $TiO_y$ $(0<y<2)$, $ZrO_y$ $(0<y<2)$, $V_2O_z$ $(0<z<3)$, $WO_y$ $(0<y<2)$, $MnO_y$ $(0<y<2)$, $Fe_2O_z$ $(0<z<3)$, $Co_3O_w$ $(0<w<4)$, $PdO_x$ $(0<x<1)$, $CuO_x$ $(0<x<1)$, $AgO_x$ $(0<x<1)$, $ZnO_x$ $(0<x<1)$, $Sb_2O_z$ $(0<z<3)$, and $SeO_y$ $(0<y<2)$. As the first metal oxide is disposed within a matrix of a carbonaceous material, uniformity of the shell disposed on the shell may be improved, and withstand voltage properties (i.e., is able to withstand high voltages) of the composite cathode active material may be further improved. For example, the shell may include $Al_2O_x$ $(0<x<3)$ as a first metal oxide.

The shell may further include second metal oxides of one or more kinds, represented by formula $M_aO_c$ $(0<a\leq3$ and $0<c\leq4$, and when a is 1, 2, or 3, c is an integer). M may be at least one metal selected from Group 2 to Group 13, Group 15, and Group 16 metals in the Periodic Table. For example, the second metal oxide may include the same metal as the first metal oxide, and the ratio of a and c, c/a, in the second metal oxide, may have a greater value than the ratio of a and b, b/a, in the first metal oxide. For example, c/a>b/a. The second metal oxide may be, for example, selected from among $Al_2O_3$, NbO, $NbO_2$, $Nb_2O_5$, MgO, $Sc_2O_3$, $TiO_2$, $ZrO_2$, $V_2O_3$, $WO_2$, $MnO_2$, $Fe_2O_3$, $Co_3O_4$, PdO, CuO, AgO, ZnO, $Sb_2O_3$, and $SeO_2$. The first metal oxide may be a reduction product of the second metal oxide. As the second metal oxide may be partially or completely reduced, the first metal oxide may be obtained. Accordingly, the first metal oxide may have a lower oxygen content (e.g., amount) than that of the second metal oxide, and may have a lower oxidation number of a metal. For example, the shell may include $Al_2O_x$ (0<x<3), which is a first metal oxide, and $Al_2O_x$ which is a second metal oxide.

In the composite cathode active material, for example, the carbonaceous material included in the shell and a transition metal of the lithium transition metal oxide included in the core may be chemically bound via a chemical bond. The carbon atom (C) of the carbonaceous material included in the shell, and the transition metal (Me) of the lithium transition metal oxide may be chemically bound, for example, through a C—O-Me bond via oxygen atoms (for example, C—O—Ni bond, or C—O—Co bond). As the carbonaceous material included in the shell and the lithium transition metal oxide included in the core are chemically bound via a chemical bond, the core and the shell are complexated. Accordingly, the resulting complex may be distinguished from a simple physical mixture of the carbonaceous material and the lithium transition metal oxide.

In some embodiments, the carbonaceous material and the first metal oxide included in the shell may be chemically bound via a chemical bond. Here, the chemical bond may be, for example, a covalent bond or an ionic bond. The covalent bond may be a bond that includes, for example, at least one from among an ester group, an ether group, a carbonyl group, an amide group, a carbonate anhydride group, and/or an acid anhydride group. The ionic bond may be a bond that includes, for example, a carboxylic acid ion, an ammonium ion, an acyl cation group, and/or the like.

A thickness of the shell may be, for example, about 1 nm to about 5 um, about 1 nm to about 1 um, about 1 nm to about 500 nm, about 1 nm to about 200 nm, about 1 nm to about 100 nm, about 1 nm to about 90 nm, about 1 nm to about 80 nm, about 1 nm to about 70 nm, about 1 nm to about 60 nm, about 1 nm to about 50 nm, about 1 nm to about 40 nm, about 1 nm to about 30 nm, or about 1 nm to about 20 nm. As the shell has a thickness in the above ranges, an electrode including the composite cathode active material may have improved electrode conductivity.

The composite cathode active material may further include, for example, a third metal doped in the core, or a third metal oxide coated on the core. In some embodiments, the shell may be disposed on the doped third metal or the coated third metal oxide. For example, after the third metal is doped on a surface of the lithium transition metal oxide included in the core, or the third metal oxide is coated on a surface of the lithium transition metal oxide, the shell may be disposed on the third metal and/or the third metal oxide. For example, the composite cathode active material may include a core; an interlayer disposed on the core; and a shell disposed on the interlayer, wherein the interlayer may include a third metal or a third metal oxide. The third metal may be at least one metal selected from Al, Zr, W, and Co, and the third metal oxide may be $Al_2O_3$, $Li_2O$—$ZrO_2$, $WO_2$, CoO, $Co_2O_3$, $Co_3O_4$, and the like.

The shell included in the composite cathode active material may include, for example, at least one selected from among a composite including a first metal oxide, a carbonaceous material, e.g. graphene, and/or doped fluorine (F) element and a milling product of the composite, and the first metal oxide is disposed within a matrix of the graphene-based material, for example, a graphene matrix. The shell may be produced, for example, from a composite including a first metal oxide, a carbonaceous material e.g., graphene, and/or doped fluorine (F) element. The composite may further include a second metal oxide different than the first metal oxide. The composite may include, for example, first metal oxides of two or more kinds. The composite may include, for example, first metal oxides of two or more kinds, and second metal oxides of two or more kinds.

An amount of at least one of the composite included in the composite cathode active material and a milling product thereof may be 3 wt % or less, 2 wt % or less, 1 wt % or less, 0.5 wt % or less, or 0.2 wt % or less, with respect to the total weight of the composite cathode active material. The amount of at least one of the composite and a milling product thereof may be about 0.01 wt % to about 3 wt %, about 0.01 wt % to about 1 wt %, about 0.01 wt % to about 0.7 wt %, about 0.01 wt % to about 0.5 wt %, about 0.01 wt % to about 0.2 wt %, about 0.01 wt % to about 0.1 wt %, or about 0.03 wt % to about 0.07 wt %, with respect to the total weight of the composite cathode active material. As the composite cathode active material includes at least one of the composite and the milling product thereof in an amount in the above ranges, a lithium battery including the composite cathode active material may have further improved cycle characteristics.

The amount of doped fluorine (F) element included in the composite may be, for example, about 1 at % to about 10 at %, about 1 at % to about 9 at %, about 2 at % to about 9 at %, about 2 at % to about 8 at %, about 3 at % to about 8 at %, about 3 at % to about 7 at %, about 4 at % to about 7 at %, or about 4 at % to about 6 at %, with respect to the total number of atoms of the composite. As the composite is doped with fluorine (F) element in an amount in the above ranges, a lithium battery employing the composite cathode active material having the shell including the composite and/or the milling product thereof may have further improved cycle characteristics. The amount of doped fluorine (F) element included in the composite may be calculated from, for example, peaks on the XPS spectrum measured on a surface of the composite or a surface of the composite cathode active material coated with the composite.

At least one selected from among the first metal oxide and the second metal oxide included in the composite may have an average particle diameter of about 1 nm to about 1 um, about 1 nm to about 500 nm, about 1 nm to about 200 nm, about 1 nm to about 100 nm, about 1 nm to about 70 nm, about 1 nm to about 50 nm, about 1 nm to about 30 nm, about 3 nm to about 30 nm, about 3 nm to about 25 nm, about 5 nm to about 25 nm, about 5 nm to about 20 nm, about 7 nm to about 20 nm, or about 7 nm to about 15 nm. The first metal oxide and the second metal oxide have a particle diameter in a nano-sized range, and as a result may be more uniformly distributed within a carbonaceous matrix of the composite. Accordingly, the composite may be coated substantially uniformly on the core without aggregation, thereby forming a shell. In some embodiments, the first metal oxide and/or the second metal oxide have a particle diameter in the above ranges, and as a result may be more uniformly distributed on the core. Accordingly, as the first metal oxide and/or the second metal oxide are substantially uniformly disposed on the core, withstand voltage properties (i.e., is able to withstand high voltages) may be more effectively achieved.

The average particle diameter of the first metal oxide and the second metal oxide may be measured, for example, by utilizing a measurement device such as laser diffraction or dynamic light scattering. The average diameter is a value of median particle diameter (D50) at cumulative 50% counted from the smallest particle size in a volume distribution measured utilizing a laser scattering particle diameter distribution system (for example, LA-920 by HORIBA Inc.).

A deviation in uniformity of at least one selected from among the first metal oxide and the second metal oxide included in the composite may be 3% or less, 2% or less, or 1% or less. Uniformity may be calculated by XPS, for example. Accordingly, in the composite, at least one selected from among the first metal oxide and the second metal oxide may be substantially uniformly distributed with a deviation of 3% or less, 2% or less, or 1% or less.

The carbonaceous material included in the composite may have, for example, a branched structure, and at least one metal oxide selected from among the first metal oxide and the second metal oxide may be distributed within the branched structure of the carbonaceous material. The branched structure of the carbonaceous material may include, for example, a plurality of carbonaceous material particles in contact with one another. As the carbonaceous material has such a branched structure, one or more suitable conduction paths may be provided.

The carbonaceous material included in the composite may be, for example, graphene. The graphene may have, for example, a branched structure, and at least one metal oxide selected from among the first metal oxide and the second metal oxide may be distributed within the branched structure of graphene. The branched structure of graphene may include, for example, a plurality of graphene structures in contact with one another. As the graphene has such a branched structure, one or more suitable conduction paths may be provided.

The carbonaceous material included in the composite may have, for example, a substantially spherical structure, and at least one metal oxide selected from among the first metal oxide and the second metal oxide may be distributed within the substantially spherical structure. The spherical structure of the carbonaceous material may have a size (average diameter) of about 50 nm to about 300 nm. The carbonaceous material having a spherical structure may be provided in plurality (e.g., have a plurality of spherical structures). As the carbonaceous material has a spherical structure, the composite may have a secure (stable) structure.

The carbonaceous material included in the composite may be, for example, graphene. The graphene may have, for example, a substantially spherical structure, and at least one metal oxide selected from among the first metal oxide and the second metal oxide may be distributed within the spherical structure. The spherical structure of graphene may have a size (average diameter) of about 50 nm to about 300 nm. The graphene may have a plurality of spherical structures. As the graphene has a spherical structure, the composite may have a secure (stable) structure.

The carbonaceous material included in the composite may have, for example, a spiral structure in which a plurality of spherical structures are connected, and at least one metal oxide selected from among the first metal oxide and the second metal oxide may be distributed within the spherical structures of the spiral structure. The spiral structure of the carbonaceous material may have a size (average diameter)

of about 500 nm to about 100 um. As the carbonaceous material has a spiral structure, the composite can have a secure (stable) structure.

The carbonaceous material included in the composite may be, for example, graphene. The graphene included in the composite may have, for example, a spiral structure in which a plurality of spherical structures are connected, and at least one metal oxide selected from among the first metal oxide and the second metal oxide may be distributed within the spherical structures of the spiral structure. The spiral structure of graphene may have a size (average diameter) of about 500 nm to about 100 um. As the graphene has a spiral structure, the composite can have a secure (stable) structure.

The carbonaceous material included in the composite may have, for example, a cluster structure in which a plurality of spherical structures are clustered, and at least one metal oxide selected from among the first metal oxide and the second metal oxide may be distributed within the spherical structures of the cluster structure. The cluster structure of the carbonaceous material may have a size (average diameter) of about 0.5 mm to about 10 cm. As the carbonaceous material has a cluster structure, the composite can have a secure (stable) structure.

The carbonaceous material included in the composite may be, for example, graphene. The graphene included in the composite may have, for example, a cluster structure in which a plurality of spherical structures are clustered, and at least one metal oxide selected from among the first metal oxide and the second metal oxide may be distributed within the spherical structures of the cluster structure. The cluster structure of the graphene may have a size (average diameter) of about 0.5 mm to about 10 mm. As the graphene has a cluster structure, the composite can have a secure (stable) structure.

The composite may have, for example, a crumpled faceted-ball structure, and at least one selected from the first metal oxide and the second metal oxide may be distributed within or on a surface of the structure. As the composite is such a faceted-ball structure, the composite may be easily coated on irregular surface bumps of the core.

The composite may have, for example, a planar structure, and at least one selected from the first metal oxide and the second metal oxide may be distributed within or on a surface of the structure. As the composite is such a two-dimension planar structure, the composite may be easily coated on irregular surface bumps of the core.

The carbonaceous material included in the composite may extend from the first metal oxide by a distance of 10 nm or less and may include at least 1 to 20 carbonaceous material layers. For example, as a plurality of carbonaceous material layers are deposited, a carbonaceous material having a total thickness of 12 nm or less may be disposed on the first metal oxide. For example, the total thickness of the carbonaceous material may be about 0.6 nm to about 12 nm.

The carbonaceous material included in the composite may be, for example, graphene. The graphene included in the composite may extend from the first metal oxide by a distance of 10 nm or less and may include at least 1 to 20 carbonaceous material layers. For example, as a plurality of graphene layers are deposited, graphene having a total thickness of 12 nm or less may be disposed on the first metal oxide. For example, the total thickness of the graphene may be about 0.6 nm to about 12 nm.

The core included in the composite cathode active material may include, for example, a lithium transition metal oxide represented by Formula 1.

$$\text{Li}_a\text{Ni}_x\text{CO}_y\text{M}_z\text{O}_{2-b}\text{A}_b \qquad \text{Formula 1}$$

In Formula 1, $0.9 \leq a \leq 1.2$, $0 \leq b \leq 0.2$, $0.8 \leq x \leq 1.0$, $0 \leq y \leq 0.3$, $0 < z \leq 0.3$, and $x+y+z=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or one or more combinations thereof, and A is F, S, Cl, Br, or one or more combinations thereof. In Formula 1, for example, $1.0 \leq a \leq 1.2$, $0 \leq b \leq 0.2$, $0.8 \leq x \leq 0.95$, $0 \leq y \leq 0.2$, $0 < z \leq 0.2$, and $x+y+z=1$.

The core included in the composite cathode active material may include, for example, a lithium transition metal oxide represented by Formulas 2 to 4.

$$\text{LiNi}_x\text{Co}_y\text{Mn}_z\text{O}_2 \qquad \text{Formula 2}$$

$$\text{LiNi}_x\text{Co}_y\text{Al}_z\text{O}_2 \qquad \text{Formula 3}$$

In Formulas 2 to 3, $0.8 \leq x \leq 0.95$, $0 < y \leq 0.2$, $0 < z \leq 0.2$, and $x+y+z=1$.

$$\text{LiNi}_x\text{Co}_y\text{Mn}_v\text{Al}_w\text{O}_2 \qquad \text{Formula 4}$$

In Formula 4, $0.8 \leq x \leq 0.95$, $0 < y \leq 0.2$, $0 < v \leq 0.2$, $0 < w \leq 0.2$, and $x+y+v+w=1$.

The lithium transition metal oxide of Formulas 1 to 4 has a high nickel content (e.g., amount) of 80 mol % or more, 85 mol % or more, or 90 mol % or more with respect to the total number of moles of the total transition metal, and may provide excellent or suitable initial capacity, room-temperature lifetime characteristics, and high-temperature lifetime characteristics. For example, the nickel content (e.g., amount) in the lithium transition metal oxide of Formulas 1 to 4 may be about 80 mol % to about 95 mol %, about 85 mol % to about 95 mol %, or about 90 mol % to about 95 mol % with respect to the total number of moles of the transition metal.

The core included in the composite cathode active material may include, for example, a lithium transition metal oxide represented by Formulas 5 to 6.

$$\text{Li}_a\text{Co}_x\text{M}_y\text{O}_{2-b}\text{A}_b \qquad \text{Formula 5}$$

In Formula 5, $1.0 \leq a \leq 1.2$, $0 \leq b \leq 0.2$, $0.9 \leq x \leq 1$, $0 \leq y \leq 0.1$, and $x+y=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or one or more combinations thereof, and A is F, S, Cl, Br, or one or more combinations thereof.

$$\text{LiCoO}_2 \qquad \text{Formula 6}$$

A cathode according to another example includes the above-described composite cathode active material. The cathode includes the above-described composite cathode active material, and as a result may provide improved cycle characteristics and increased conductivity.

The cathode may be prepared by an example method described below, but the method is not necessarily limited thereto and may be adjusted according to required conditions.

First, the above-described composite cathode active material, a conductor, a binder, and/or a solvent may be mixed to prepare a cathode active material composition. The prepared cathode active material composition may be directly coated and dried on an aluminum current collector to thereby form a cathode plate with a cathode active material layer formed thereon. In some embodiments, the cathode active material composition may be cast on a separate support, and a film exfoliated from the support may be laminated on the aluminum current collector to thereby form a cathode plate with a cathode active material layer formed thereon.

Examples of the conductive material may include: carbon black, graphite powder, natural graphite, artificial graphite, acetylene black, Ketjenblack, and carbon fibers; carbon nanotubes; metal powder, metal fibers, or metal tubes, such as copper, nickel, aluminum, silver, etc.; and conductive polymers such as polyphenylene derivatives, and/or the like, but are not limited to the aforementioned components and may be any suitable material that is utilized as a conductive material in the relevant art. The components should be apparent to one of ordinary skill in the art upon reviewing the present disclosure.

Examples of the binder may include a vinylidene fluoride/hexafluoropropylene copolymer, polyvinylidene fluoride, polyacrylonitrile, polymethylmethacrylate, polytetrafluoroethylene (PTFE), one or more mixtures of the aforementioned polymers, a styrene butadiene rubber-based polymer, and the solvent may be N-methylpyrrolidone (NMP), acetone, water, and/or the like, but is not necessarily limited thereto, and may be any suitable solvent utilized in the relevant technical art. The solvents should be apparent to one of ordinary skill in the art upon reviewing the present disclosure.

It is also possible to create pores inside the electrode plate by further adding a plasticizer and a pore forming agent to the cathode active material composition.

The amounts of the cathode active material, the conductor, the binder, and the solvent utilized in the cathode are at levels utilized in a lithium battery that should be apparent to one of ordinary skill in the art upon reviewing the present disclosure. Depending on the intended use and composition of a lithium battery, one or more of the conductor, the binder, and/or the solvent can be left out.

The amount of the binder included in the cathode may be about 0.1 wt % to about 10 wt %, or about 0.1 wt % to about 5 wt % with respect to the total weight of the cathode active material layer. The amount of the composite cathode active material included in the cathode may be about 90 wt % to about 99 wt %, or about 95 wt % to about 99 wt %, with respect to the total weight of the cathode active material layer.

In some embodiments, the cathode may additionally include suitable cathode active materials other than the above-described composite cathode active material. The cathode active materials should be apparent to one of ordinary skill in the art upon reviewing the present disclosure.

Such cathode active materials may be, without limitations, any lithium-containing metal oxides utilized in the relevant art that should be apparent to one of ordinary skill in the art upon reviewing the present disclosure. Examples of such cathode active materials include one or more selected from composite oxides of lithium with a metal selected from among cobalt, manganese, nickel, and one or more combinations thereof, and for example, include a compound represented by any one of the following formulas: $\text{Li}_a\text{A}_{1-b}\text{B'}_b\text{D}_2$ (In this formula, $0.90 \leq a \leq 1$ and $0 \leq b \leq 0.5$); $\text{Li}_a\text{E}_{1-b}\text{B'}_b\text{O}_{2-c}\text{D}_c$ (In this formula, $0.90 \leq a \leq 1$, $0 \leq b \leq 0.5$, $0 \leq c \leq 0.05$); $\text{LiE}_{2-b}\text{B'}_b\text{O}_{4-c}\text{D}_c$ (In this formula, $0 \leq b \leq 0.5$, $0 \leq c \leq 0.05$); $\text{Li}_a\text{Ni}_{1-b-c}\text{Co}_b\text{B'}_c\text{D}_\alpha$ (In this formula, $0.90 \leq a \leq 1$, $0 \leq b \leq 0.5$, $0 \leq c \leq 0.05$, $0 < \alpha \leq 2$); $\text{Li}_a\text{Ni}_{1-b-c}\text{Co}_b\text{B'}_c\text{O}_{2-\alpha}\text{F'}_\alpha$ (In this formula, $0.90 \leq a \leq 1$, $0 \leq b \leq 0.5$, $0 \leq c \leq 0.05$, $0 < \alpha < 2$); $\text{Li}_a\text{Ni}_{1-b-c}\text{Co}_b\text{B'}_c\text{O}_{2-\alpha}\text{F'}_2$ (In this formula, $0.90 \leq a \leq 1$, $0 \leq b \leq 0.5$, $0 \leq c \leq 0.05$, $0 < \alpha < 2$); $\text{Li}_a\text{Ni}_{1-b-c}\text{Mn}_b\text{B'}_c\text{D}_\alpha$ (In this formula, $0.90 \leq a \leq 1$, $0 \leq b \leq 0.5$, $0 \leq c \leq 0.05$, $0 < \alpha \leq 2$); $\text{Li}_a\text{N}$-$\text{i}_b\text{E}_c\text{G}_d\text{O}_2$ (In this formula, $0.90 \leq a \leq 1$, $0 \leq b \leq 0.9$, $0 \leq c \leq 0.5$, $0.001 \leq d \leq 0.1)$; $Li_aNi_bCo_cMn_dGeO_2$ (In this formula, $0.90 \leq a \leq 1$, $0 \leq b \leq 0.9$, $0 \leq c \leq 0.5$, $0 \leq d \leq 0.5$, $0.001 \leq e \leq 0.1)$; $Li_aNiG_bO_2$ (In this formula, $0.90 \leq a \leq 1$, $0.001 \leq b \leq 0.1)$; $Li_aCoG_bO_2$ (In this formula, $0.90 \leq a \leq 1$, $0.001 \leq b \leq 0.1)$; $Li_aMnG_bO_2$ (In this formula, $0.90 \leq a \leq 1$, $0.001 \leq b \leq 0.1)$; $Li_aMn_2GbO_4$ (In this formula, $0.90 \leq a \leq 1$, $0.001 \leq b \leq 0.1)$; $QO_2$; $QS_2$; $LiQS_2$; $V_2O_5$; $LiV_2O_5$; $LiIO_2$; $LiNiVO_4$; $Li_{(3-f)}J_2(PO_4)_3(0 \leq f \leq 2)$; $Li_{(3-f)}Fe_2(PO_4)_3(0 \leq f \leq 2)$; and/or $LiFePO_4$.

In the formulas representing the above-described compound, A is Ni, Co, Mn, or one or more combinations thereof; B' is Al, Ni, Co, Mn, Cr, Fe, Mg, Sr, V, a rare-earth element, or one or more combinations thereof; D is O, F, S, P, or one or more combinations thereof; E is Co, Mn, or one or more combinations thereof; F' is F, S, P, or one or more combinations thereof; G is Al, Cr, Mn, Fe, Mg, La, Ce, Sr, V, or one or more combinations thereof; Q is Ti, Mo, Mn, or one or more combinations thereof, I' is Cr, V, Fe, Sc, Y, or one or more combinations thereof; and J is V, Cr, Mn, Co, Ni, Cu, or one or more combinations thereof.

A compound having a coating layer added on a surface of the above-described compound may also be utilized, and a mixture of the above compound and a compound having a coating layer added thereon may also be utilized. The coating layer added on the surface of the above-described compound may include, for example, compounds of a coating element, such as oxides and hydroxides of the coating element, oxyhydroxides of the coating element, oxycarbonates of the coating element, and/or hydroxycarbonates of the coating element. Compounds forming the above coating layer may be amorphous or crystalline. The coating element included in the coating layer may be Mg, Al, Co, K, Na, Ca, Si, Ti, V, Sn, Ge, Ga, B, As, Zr, or one or more mixtures thereof. The method by which the coating layer is formed, is selected from among methods that do not adversely affect the physical properties of a cathode active material. The coating method may be, for example, a spray coating method, a dipping method, and/or the like. Such suitable coating methods should be apparent to those of ordinary skill in the art upon reviewing the present disclosure.

A lithium battery according to another example employs a cathode including the above-described composite cathode active material.

As the lithium battery employs a cathode including the above-described composite cathode active material, improved cycle characteristics and thermal stability may be achieved.

The lithium battery may be prepared by an example method described below, but the method is not necessarily limited thereto and can be adjusted according to required conditions.

First, a cathode is prepared according to the above-described method for cathode preparation.

Next, an anode is prepared in the process described below. The anode is prepared by substantially the same method as the cathode, except that for example, an anode active material is utilized instead of a composite cathode active material. In some embodiments, substantially the same conductor, binder, and/or solvent as utilized for the cathode may be utilized in an anode active material composition.

For example, the anode active material composition may be prepared by mixing the anode active material, the conductor, the binder, and/or the solvent, and the composition is directly coated on a copper current collector, to thereby form an anode plate. In some embodiments, the prepared anode active material composition may be cast on a separate support, and an anode active material film exfoliated from the support may be laminated on the copper current collector, to thereby form an anode plate.

The anode active material may be any suitable material that is utilized as an anode active material for lithium batteries in the relevant art and these materials should be apparent to one of ordinary skill in the art upon reviewing the present disclosure. For example, the anode active material may include one or more selected from the group including (e.g., consisting of) lithium metal, a metal that may be alloyed with lithium, a transition metal oxide, a non-transition metal oxide, and a carbonaceous material.

Examples of the metal that may be alloyed with lithium include Si, Sn, Al, Ge, Pb, Bi, Sb, Si—Y' alloys (Here, Y' is an alkali metal, an alkali earth metal, a Group 13 element, a Group 14 element, a transition metal, a rare-earth element, or one or more combinations of the aforementioned elements, and is not Si), a Sn—Y" alloy (Here, Y" is an alkali metal, an alkali earth metal, an element in Group 13, an element in Group 14, a transition metal, a rare-earth element, or one or more combinations of the aforementioned elements, and is not Sn), and/or the like. Element Y may be, for example, Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Ti, Ge, P, As, Sb, Bi, S, Se, Te, Po, or one or more combinations thereof.

The transition metal oxide may be, for example, a lithium titanium oxide, a vanadium oxide, a lithium vanadium oxide, and/or the like.

The non-transition metal oxide may be, for example, $SnO_2$, $SiO_x$ (0<x<2), and/or the like.

The carbonaceous material may be, for example, a crystalline carbon, an amorphous carbon, or a mixture thereof. Examples of the crystalline carbon may include graphite, including artificial graphite or natural graphite in substantially shapeless, plate, flake, spherical or fiber form. Examples of the amorphous carbon may include soft carbon (low-temperature calcined carbon) or hard carbon, mesophase pitch carbides, calcined cokes, and/or the like.

The amounts of the anode active material, the conductor, the binder, and/or the solvent are at levels utilized in a lithium battery that should be apparent to one of ordinary skill in the art upon reviewing the present disclosure. Depending on the intended utilize and composition of a lithium battery, one or more of the conductor, the binder, and/or the solvent may not be used (e.g., may be excluded).

The amount of the binder included in the anode may be, for example, about 0.1 wt % to about 10 wt %, or about 0.1 wt % to about 5 wt % with respect to the total weight of the anode active material layer. The amount of the conductor included in the anode may be, for example, about 0.1 wt % to about 10 wt %, or about 0.1 wt % to about 5 wt % with respect to the total weight of the anode active material layer. The amount of the anode active material included in the anode may be, for example, about 90 wt % to about 99 wt %, or about 95 wt % to about 99 wt %, with respect to the total weight of the anode active material layer. In an embodiment in which the anode active material is lithium metal, the anode may not include (e.g., may exclude) a binder and a conductor.

Next, a separator to be placed between the cathode and the anode is prepared.

The separator may be any suitable separator that is utilized in a lithium battery. These separators should be apparent to one of ordinary skill in the art upon reviewing the present disclosure. The separator may be, for example, a separator having a low resistance to ion movement in electrolyte and capable of retaining a large amount of an electrolyte solution. The separator may be, for example, selected from among glass fiber, polyester, Teflon, polyethylene, polypropylene, polytetrafluoroethylene (PTFE), and one or more combinations thereof, and may be in the form of a nonwoven fabric or a woven fabric. In a lithium ion battery, a separator capable of being wound, such as polyethylene, polypropylene, etc. may be utilized, and in a lithium ion polymer battery, a separator capable of retaining a large amount of an organic electrolyte solution may be utilized.

The separator may be prepared by an example method described below, but the method is not necessarily limited thereto and can be adjusted according to required conditions.

First, a separator composition may be prepared by mixing a polymer resin, a filler, and/or a solvent. The separator composition may be directly coated and dried on an electrode to thereby form a separator. In some embodiments, the separator composition may be cast and dried on a support, and a separator film exfoliated from the support may be laminated on an electrode to thereby form a separator.

A polymer utilized in the preparation of the separator is not limited and may, for example, be any suitable polymer that is utilized in a binding material for an electrode plate. For example, a vinylidene fluoride/hexafluoropropylene copolymer, polyvinylidene fluoride (PVDF), polyacrylonitrile, polymethyl methacrylate, or one or more mixtures thereof may be utilized.

Next, an electrolyte may be prepared.

The electrolyte may be, for example, an organic electrolyte solution. The organic electrolyte solution may be prepared by dissolving a lithium salt in an organic solvent.

The organic solvent may be any suitable material that is utilized as an organic solvent in the relevant art. These solvents should be apparent to one of ordinary skill in the art upon reviewing the present disclosure. Examples of the organic solvent may include propylene carbonate, ethylene carbonate, fluoroethylene carbonate, butylene carbonate, dimethyl carbonate, diethyl carbonate, methyl ethyl carbonate, methyl propyl carbonate, ethyl propyl carbonate, methyl isopropyl carbonate, dipropyl carbonate, dibutyl carbonate, benzonitrile, acetonitrile, tetrahydrofuran, 2-methyltetrahydrofuran, γ-butyrolactone, dioxolane, 4-methyldioxolane, N,N-dimethylformamide, dimethylacetamide, dimethylsulfoxide, dioxane, 1,2-dimethoxyethane, sulfolane, dichloroethane, chlorobenzene, nitrobenzene, diethylene glycol, dimethyl ether, or one or more mixtures thereof.

The lithium salt may be any suitable material that is utilized as a lithium salt in the relevant art. These salts should be apparent to one of ordinary skill in the art upon reviewing the present disclosure. Examples of the lithium salt may include $LiPF_6$, $LiBF_4$, $LiSbF_6$, $LiAsF_6$, $LiClO_4$, $LiCF_3SO_3$, $Li(CF_3SO_2)_2N$, $LiC_4F_9SO_3$, $LiAlO_2$, $LiAlCl_4$, $LiN(C_xF_{2x+1}SO_2)(C_yF_{2y+1}SO_2)$ (wherein x and y are natural numbers of 1 to 20), LiCl, LiI, or one or more mixtures thereof.

In some embodiments, the electrolyte may be a solid electrolyte. Examples of the solid electrolyte may include a boron oxide, a lithium oxynitride, and/or the like, but are not limited thereto and may be any suitable material that is utilized as a solid electrolyte in the relevant art. These solid electrolytes should be apparent to one of ordinary skill in the art upon reviewing the present disclosure. The solid electrolyte may be formed on the anode by a method such as sputtering, for example, or a separate solid electrolyte sheet may be stacked on the anode.

The solid electrolyte may be, for example, an oxide-based solid electrolyte or a sulfide-based solid electrolyte.

For example, the solid electrolyte may be an oxide-based solid electrolyte. The oxide-based solid electrolyte may be one or more selected from among $Li_{1+x+y}Al_xTi_{2-x}Si_yP_{3-y}O_{12}$ (0<x<2, 0≤y<3), $BaTiO_3$, $Pb(Zr,Ti)O_3(PZT)$, $Pb_{1-x}La_xZr_{1-y}Ti_yO_3(PLZT)$(0≤x<1, 0≤y<1), $PB(Mg_3Nb_{2/3})O_3$—$PbTiO_3$ (PMN-PT), $HfO_2$, $SrTiO_3$, $SnO_2$, $CeO_2$, $Na_2O$, MgO, NiO, CaO, BaO, ZnO, $ZrO_2$, $Y_2O_3$, $Al_2O_3$, $TiO_2$, $SiO_2$, $Li_3PO_4$, $Li_xTi_y(PO_4)_3$(0<x<2, 0<y<3), $Li_xAl_yTi_z(PO_4)_3$ (0<x<2, 0<y<1, 0<z<3), $Li_{1+x+y}Ga)_x(Ti, Ge)_{2-x}Si_yP_{3-y}O_{12}$ (0≤x≤1≤y≤1), $Li_xLa_yTiO_3$ (0<x<2, 0<y<3), $Li_2O$, LiOH, $Li_2CO_3$, $LiAlO_2$, $Li_2O$—$Al_2O_3$—$SiO_2$—$P_2O_5$—$TiO_2$—$GeO_2$, and $Li_{3+x}La_3M_2O_{12}$ (M=Te, Nb, or Zr, x is an integer of 1 to 10). The solid electrolyte may be prepared by a sintering method, and/or the like. For example, the oxide-based solid electrolyte may be a garnet-type or kind solid electrolyte selected from among $Li_7La_3Zr_2O_{12}$ (LLZO) and $Li_{3+x}La_3Zr_{2-a}M_aO_{12}$ (M doped LLZO, M=Ga, W, Nb, Ta, or Al, and x is an integer of 1 to 10).

The sulfide-based solid electrolyte may include, for example, lithium sulfide, silicon sulfide, phosphorus sulfide, boron sulfide, or one or more combinations thereof. Sulfide-based solid electrolyte particles may include $Li_2S$, $P_2S_5$, $SiS_2$, $GeS_2$, $B_2S_3$, or one or more combinations thereof. The sulfide-based solid electrolyte particles may be $Li_2S$ or $P_2S_5$. The sulfide-based solid electrolyte particles may have a higher lithium ion conductivity than that of other inorganic compounds. For example, the sulfide-based solid electrolyte may include $Li_2S$ and/or $P_2S_5$. In an embodiment in which a sulfide solid electrolyte material forming the sulfide-based solid electrolyte includes $Li_2S$—$P_2S_5$, a mixing molar ratio of $Li_2S$ to $P_2S_5$ may be, for example, in a range of about 50:50 to about 90:10. In some embodiments, an inorganic solid electrolyte prepared by adding a material, such as $Li_3PO_4$, a halogen, a halogen compound, $Li_{2+2x}Zn_{1-x}GeO_4$ ("LISICON", 0≤x<1), $Li_{3+y}PO_{4-x}N_x$ ("LIPON", 0<x<4, 0<y<3), $Li_{3.25}Ge_{0.25}P_{0.75}S_4$ ("Thio-LISICON"), $Li_2O$—$Al_2O_3$—$TiO_2$—$P_2O_5$ ("LATP"), to an inorganic solid electrolyte, such as $Li_2S$—$P_2S_5$, $SiS_2$, $GeS_2$, $B_2S_3$, or a combination thereof, may be utilized as a sulfide solid electrolyte. Non-limiting examples of the sulfide solid electrolyte material may include $Li_2S$—$P_2S_5$; $Li_2S$—$P_2S_5$—LiX (X=a halogen element); $Li_2S$—$P_2S_5$—$Li_2O$; $Li_2S$—$P_2S_5$—$Li_2O$—LiI; $Li_2S$—$SiS_2$; $Li_2S$—$SiS_2$—LiI; $Li_2S$—$SiS_2$—LiBr; $Li_2S$—$SiS_2$—LiCl; $Li_2S$—$SiS_2$—$B_2S_3$—LiI; $Li_2S$—$SiS_2$—$P_2S_5$—LiI; $Li_2S$—$B_2S_3$; $Li_2S$—$P_2S_5$—$Z_mS_n$; (0<m<10, 0<n<10, Z=Ge, Zn or Ga); $Li_2S$—$GeS_2$; $Li_2S$—$SiS_2$—$Li_3PO_4$; and/or $Li_2S$—$SiS_2$—$Li_pMO_q$ (0<p<10, 0<q<10, M=P, Si, Ge, B, Al, Ga or In). In this regard, a sulfide-based solid electrolyte material may be prepared by subjecting a starting material (e.g., $Li_2S$, $P_2S_5$, etc.) of the sulfide-based solid electrolyte material to a treatment such as a melt quenching method, a mechanical milling method, and/or the like. Also, a calcination process may be performed subsequent to the above treatment. The sulfide-based solid electrolyte may be amorphous or crystalline, or may be in a mixed state thereof.

Figure 2:
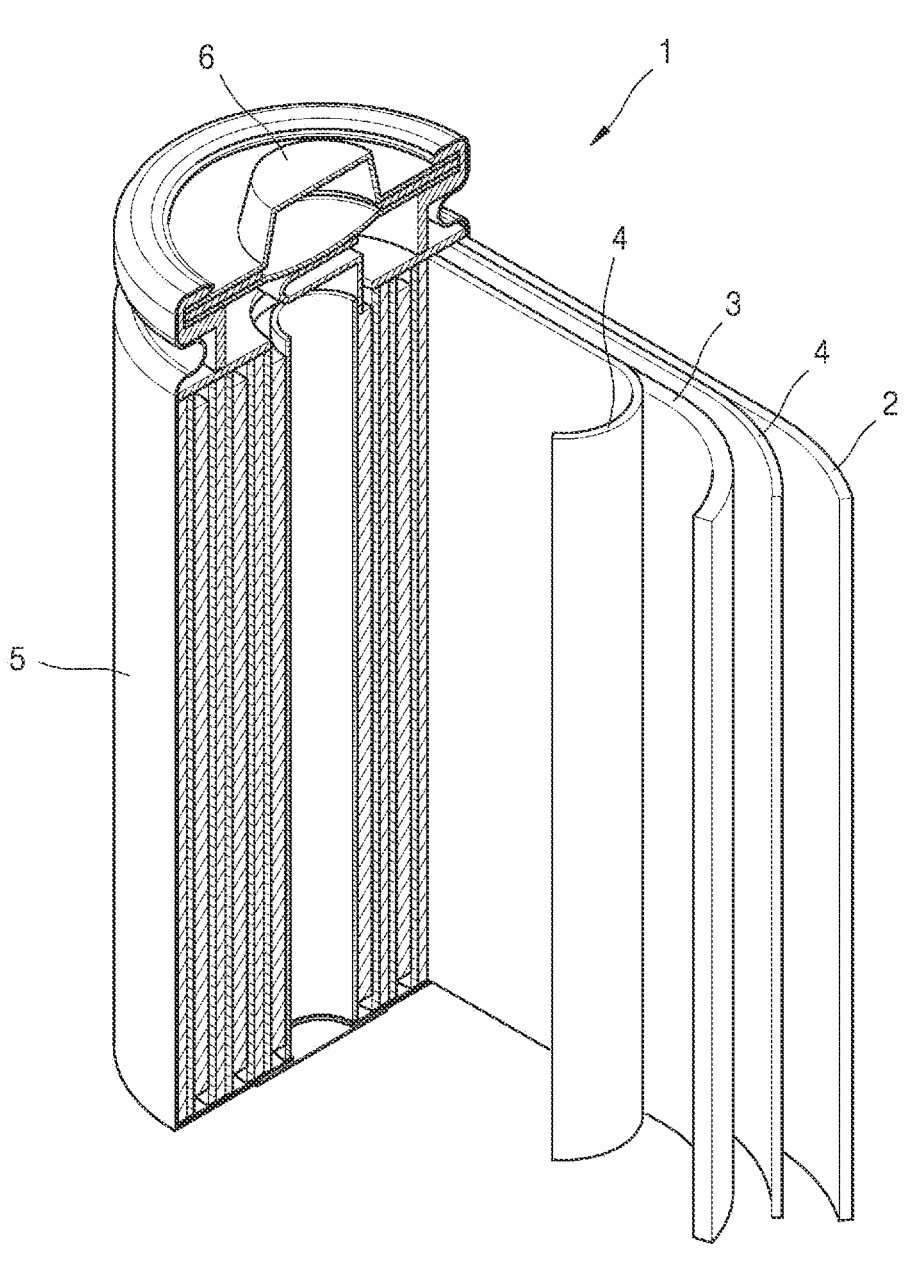
FIG. 2 is a schematic cross-sectional diagram of a lithium battery according to an example.

As shown in FIG. 2, an example lithium battery 1 includes a cathode 3, an anode 2, and a separator 4. The cathode 3, the anode 2, and the separator 4, either wound or folded, are accommodated in a battery case 5. An organic electrolyte solution may be injected in the battery case 5, and sealed with a cap assembly 6, to thereby form the lithium battery 1. The battery case 5 has a substantially cylindrical shape, but is not necessarily limited thereto, and may have a polygonal shape, a thin-film shape, and/or the like.

A pouch-type or kind lithium battery may include one or more battery structures. A separator may be disposed between a cathode and an anode, to thereby form a battery structure. The battery structures may be laminated in a bi-cell structure, and immersed in an organic electrolyte solution, and accommodated and sealed in a pouch, to thereby form a pouch-type or kind lithium battery.

A plurality of lithium batteries are stacked to form a battery module and/or a battery pack, and such a battery module and/or a battery pack may be utilized in all types (kinds) of devices in which high capacity and high output are required. For example, such a battery module and/or a battery pack may be utilized in a laptop computer, a smartphone, an electric vehicle, and/or the like.

A lithium battery utilizing a solid electrolyte may be a solid battery or an all-solid-state battery. A lithium battery utilizing a solid electrolyte may further include a solid electrolyte in a cathode or an anode, or both (e.g., simultaneously). For example, in a lithium battery in which an electrolyte layer including a sulfide-based solid electrolyte is disposed between a cathode and an anode, the cathode or the anode, or both (e.g., simultaneously), may include the sulfide-based solid electrolyte.

The lithium battery has excellent or suitable lifetime characteristics and high-rate characteristics, and therefore may be utilized in an electric vehicle (EV), an energy storage system (ESS), and/or the like. For example, the lithium battery may be utilized in a hybrid vehicle, such as a plug-in hybrid electric vehicle (PHEV) and/or the like. Also, the lithium battery may be utilized in any (suitable) field that requires a large amount of energy storage. For example, the lithium battery may be utilized in an electric bicycle, a power tool, and/or the like.

A method of preparing a composite cathode active material according to another example includes: providing a lithium transition metal oxide; providing a composite; and mechanically milling the lithium transition metal oxide and the composite, wherein the composite includes: at least one first metal oxide represented by formula $M_aO_b$ ($0<a\leq3$ and $0<b<4$, and when a is 1, 2, or 3, b is not an integer); a carbonaceous material; and a doped fluorine (F) element, wherein the first metal oxide is disposed within a carbonaceous material matrix, and M is at least one metal selected from Groups 2 to 13, Group 15, and Group 16 metals in the Periodic Table. The milling method utilized in the mechanical milling is not limited, and is a method that brings the lithium transition metal oxide and the composite into contact by utilizing a machine, and may be any suitable method usable in the relevant art. These methods should be apparent to one of ordinary skill in the art upon reviewing the present disclosure.

An embodiment is directed to a lithium transition metal oxide. The lithium transition metal oxide may be, for example, a compound represented by Formulas 1 to 6 described above.

The provision of the composite may include, for example, providing an undoped composite by supplying a reaction gas composed of a carbon source gas, to a structure including a metal oxide; and preparing a composite by mixing the undoped composite with a fluorine (F)-containing compound.

The provision of the composite may include, for example, providing an undoped composite by supplying a reaction gas composed of a carbon source gas, to at least one second metal oxide represented by $M_aO_c$ ($0<a\leq3$ and $0<c\leq4$, and when a is 1, 2, or 3, c is an integer) and performing a heat-treatment, wherein M is at least one metal selected from Groups 2 to 13, Group 15, and Group 16 metals in the Periodic Table.

The carbon source gas may be a compound represented by Formula 7, or a mixture gas of one or more selected from the group consisting of a compound represented by Formula 7, a compound represented by Formula 8, and an oxygen-containing gas represented by Formula 9.

$$CnH_{(2n+2-a)}[OH]_a \qquad \text{Formula 7}$$

In Formula 7, n is 1 to 20 and a is 0 or 1;

$$CnH_{2n} \qquad \text{Formula 8}$$

In Formula 8, n is 2 to 6;

$$C_xH_yO_z \qquad \text{Formula 9}$$

In Formula 9, x is 0 or an integer of 1 to 20, y is 0 or an integer of 1 to 20, and z is 1 or 2.

A compound represented by Formula 7 and a compound represented by Formula 8 are at least one selected from the group including (e.g., consisting of) methane, ethylene, propylene, methanol, ethanol, and propanol. An oxygen-containing gas represented by Formula 9 includes, for example, carbon dioxide ($CO_2$), carbon monoxide (CO), steam ($H_2O$), or a mixture thereof.

A cooling process utilizing one or more inert gases selected from the group including (e.g., consisting of) nitrogen, helium, and argon may be further conducted subsequent to the process of supplying a reaction gas composed of a carbon source gas to a second metal oxide represented by $M_aO_c$ ($0<a\leq3$ and $0<c\leq4$, and when a is 1, 2, or 3, c is an integer) and performing a heat-treatment. The cooling process refers to a process of adjusting to room temperature ($20\text{-}25°$ C.). The inert gas may include one or more inert gases selected from the group including (e.g., consisting of) nitrogen, helium, and argon.

In the method of preparing the composite, depending on a gas phase reaction, the process through which a carbonaceous material grows, such as graphene, may be carried out under one or more suitable conditions.

According to a first condition, for example, methanol may be first supplied to a reactor containing a second metal oxide represented by $M_aO_c$ ($0<a\leq3$ and $0<c\leq4$, and when a is 1, 2, or 3, c is an integer) and a temperature may be raised to a heat-treatment temperature (T). A temperature elevation time to the heat-treatment temperature (T) may be about 10 minutes to about 4 hours, and the heat-treatment temperature (T) may be in a range of about $700°$ C. to about $1,100°$ C. At the heat-treatment temperature (T), a heat-treatment may be conducted for a reaction time. The reaction time may be, for example, about 4 hours to about 8 hours. The heat-treated resultant may be cooled to room temperature, to thereby form a composite. The time it takes for the process to cool to room temperature from the heat-treatment temperature (T) may be, for example, about 1 hour to about 5 hours.

According to a second condition, for example, hydrogen may be first supplied to a reactor containing a second metal oxide represented by $M_aO_c$ ($0<a\leq3$ and $0<c\leq4$, and when a is 1, 2, or 3, c is an integer) and a temperature may be raised to a heat-treatment temperature (T). A temperature elevation time to the heat-treatment temperature (T) may be about 10 minutes to about 4 hours, and the heat-treatment temperature (T) may be in a range of about $700°$ C. to about $1,100°$ C. After conducting a heat-treatment for a set or predetermined reaction time at the heat-treatment temperature (T), methane gas may be supplied and a heat-treatment may be conducted for the remaining reaction time. The reaction time may be, for example, about 4 hours to about 8 hours. The heat-treated resultant may be cooled to room temperature, to thereby form a composite. Nitrogen may be supplied during the cooling process. The time it takes for the process to cool to room temperature from the heat-treatment temperature (T) may be, for example, about 1 hour to about 5 hours.

According to a third condition, for example, hydrogen may be first supplied to a reactor containing a second metal oxide represented by $M_aO_c$ ($0<a\le3$ and $0<c\le4$, and when a is 1, 2, or 3, c is an integer) and a temperature may be raised to a heat-treatment temperature (T). A temperature elevation time to the heat-treatment temperature (T) may be about 10 minutes to about 4 hours, and the heat-treatment temperature (T) may be in a range of about 700° C. to about 1,100° C. After conducting a heat-treatment for a set or predetermined reaction time at the heat-treatment temperature (T), a mixture gas of methane and hydrogen may be supplied, and a heat-treatment may be conducted for the remaining reaction time. The reaction time may be, for example, about 4 hours to about 8 hours. The heat-treated resultant may be cooled to room temperature, to thereby form a composite. Nitrogen may be supplied during the cooling process. The time it takes for the process to cool to room temperature from the heat-treatment temperature (T) may be, for example, about 1 hour to about 5 hours.

In the process of forming a composite, when the carbon source gas includes steam, a composite with an extremely good or suitable conductivity may be obtained. An amount of steam in the gas mixture is not limited and may be, for example, about 0.01 vol. % to about 10 vol. % with respect to 100 vol. % of the total carbon source gas. The carbon source gas may be, for example, methane; a mixture gas containing methane and/or an inert gas; or a mixture gas containing methane and an oxygen-containing gas.

The carbon source gas may be, for example, methane; a mixture gas of methane and carbon dioxide; or a mixture gas of methane, carbon dioxide, and steam. A molar ratio of methane and carbon dioxide in the mixture gas of methane and carbon dioxide may be about 1:0.20 to about 1:0.50, about 1:0.25 to about 1:0.45, or about 1:0.30 to about 1:0.40. A molar ratio of methane, carbon dioxide, and steam in the mixture gas of methane, carbon dioxide, and steam may be, for example, about 1:about 0.20 to about 0.50:about 0.01 to about 1.45, about 1:about 0.25 to about 0.45:about 0.10 to about 1.35, or about 1:about 0.30 to about 0.40:about 0.50 to about 1.0.

The carbon source gas may be, for example, carbon monoxide or carbon dioxide. The carbon source gas may be, for example, a mixture gas of methane and nitrogen. In the mixture gas of methane and nitrogen, a molar ratio of methane and nitrogen may be about 1:about 0.20 to about 1:0.50, about 1:about 0.25 to about 1:about 0.45, or about 1:about 0.30 to about 1:about 0.40. The carbon source gas may not include (e.g., may exclude) an inert gas such as nitrogen.

A heat-treatment pressure may be selected in consideration of a heat-treatment temperature, a composition of a gas mixture, a desired or suitable amount of carbon coating, and/or the like. The heat-treatment pressure may be controlled or selected by adjusting the amount of a gas mixture introduced, and the amount of a gas mixture discharged. The heat-treatment pressure may be, for example, 0.5 atm or more, 1 atm or more, 2 atm or more, 3 atm or more, 4 atm or more, or 5 atm or more.

The heat-treatment time is not limited, and may be appropriately adjusted in accordance with a heat-treatment temperature, a pressure for a heat-treatment, a composition of a gas mixture, and a desired or suitable amount of carbon coating. For example, a reaction time at the heat-treatment temperature may be, for example, about 10 minutes to about 100 hours, about 30 minutes to about 90 hours, or about 50 minutes to about 40 hours. For example, as the heat-treatment time increases, the amount of carbon being deposited, for example, a graphene (carbon) amount may increase, and as a result, electrical properties of the composite may be improved. However, such a trend may not be necessarily proportional to time. For example, after a certain time, carbon deposition, for example, graphene deposition may no longer take place, or a deposition rate may be decreased.

Through a gas-phase reaction of the above-described carbon source gas, even at a relatively low temperature, an undoped composite may be obtained by providing a substantially uniform coating of a carbonaceous material, for example, a graphene coating, on at least one selected from among a second metal oxide represented by $M_aO_c$ ($0<a\le3$ and $0<c\le4$, and when a is 1, 2, or 3, c is an integer) and a first metal oxide, which is a reduction product thereof, represented by $M_aO_b$ ($0<a\le3$ and $0<b<4$, a is 1, 2, or 3, and b is not an integer).

The carbonaceous material may include a matrix of a carbonaceous material, for example, a graphene matrix, having at least one structure selected from among a substantially spherical structure, a spiral structure in which a plurality of spherical structures are connected, a cluster structure in which a plurality of spherical structures are clustered, and a sponge structure, and at least one selected from among a first metal oxide represented by $M_aO_b$ ($0<a\le3$, $0<b<4$, a is 1, 2, or 3, and b is not an integer) and a second metal oxide represented by $M_aO_c$ ($0<a\le3$ and $0<c\le4$, and when a is 1, 2, or 3, c is an integer), distributed within the matrix of the carbonaceous material.

Next, a fluorine (F)-doped composite may be prepared by bringing the undoped composite into contact with a fluorine (F)-containing compound.

For example, the undoped composite and the F-containing compound may be mixed in a solvent to prepare a solution, and after allowing the solution to rest (e.g., remain undisturbed after mixing) for a set or predetermined time, the solvent may be removed, and washing and drying may be conducted to thereby prepare a F-doped composite. Through a chemical reaction in the solution containing the undoped composite and the F-containing compound, fluorine (F) element included in the F-containing compound may be doped in the composite.

The solvent is not limited and may be any suitable solvent capable of dissolving the F-containing compound and dispersing the undoped composite. The solvent may be, for example, an organic solvent. The solvent may be, for example, an aprotic solvent. The solvent may be, for example, acetonitrile. The time for which the solution is allowed to stand is not particularly limited as long as the time is sufficient to allow the undoped composite and the F-containing compound to react and fluorine (F) to be doped in the composite. The standing time may be, for example, about 1 day to about 10 weeks, about 1 week to about 5 weeks, about 2 weeks to about 5 weeks, or about 3 weeks to about 5 weeks. The temperature at which the solution is allowed to stand is not particularly limited as long as it allows the undoped composite and the F-containing compound to react and fluorine (F) to be doped in the composite. The temperature at which the solution is allowed to stand may be, for example, about 10° C. to 50° C., or about 20° C. to about 30° C.

In some embodiments, a fluorine (F)-doped composite may be prepared by bringing the undoped composite into contact with a fluorine (F)-containing compound in a gaseous state.

The F-containing compound is not limited so long as it is a compound containing a fluorine (F) atom, and may be an F-containing organic compound or an F-containing inorganic compound. The F-containing compound may be, for example, a fluorination agent.

The F-containing compound may be, for example, a chemical species in a liquid, gas, or plasma state, containing F.

The fluorine (F)-containing compound may be for example, at least one selected from among hydrogen fluoride (HF), $[NO_2]BF_4$ (nitronium tetraborate), $[Et_2NSF_2]BF_4$ (diethylamino)difluorosulfonium tetrafluoroborate), $HPF_6$, $XeF_2$, $F_2$ gas, $F_2/Ar$ plasma, $CF_4$ plasma, $SF_6$ plasma, and one or more combinations thereof.

Next, a lithium transition metal oxide and a composite may be mechanically milled. When milling, a NOBILTA mixer and/or the like may be utilized. A rotation rate of a mixer when milling may be, for example, about 1,000 rpm to about 2,500 rpm. When the milling speed is less than 1,000 rpm, a shear force applied to the composite and the lithium transition metal oxide is weak, and as a result, it is difficult for the lithium transition metal oxide and the composite to form a chemical bond. When the milling speed is excessively high, complexation takes place within too short a time, and as a result, it may be difficult to form a substantially uniform and substantially continuous shell with the composite uniformly coated on the lithium transition metal oxide. The milling time may be, for example, about 5 minutes to about 100 minutes, about 5 minutes to about 60 minutes, or about 5 minutes to about 30 minutes. When the milling time is too short, it may be difficult to form a substantially uniform and substantially continuous shell with the composite uniformly coated on the lithium transition metal oxide. When the milling time is too long, production efficiency may be decreased. The amount of the composite may be 3 wt % or less, 2 wt % or less, or 1 wt % or less, with respect to the total weight of the composite and the lithium transition metal oxide. The amount of the composite may be, for example, about 0.01 wt % to about 3 wt %, about 0.1 wt % to about 2 wt %, about 0.1 wt % to about 1 wt %, with respect to the total weight of the composite and the lithium transition metal oxide. For example, with respect to 100 parts by weight of the mixture of the lithium transition metal oxide and the composite, the amount of the composite may be about 0.01 to about 3 parts by weight, about 0.1 to about 3 parts by weight, about 0.1 to about 2 parts by weight, or about 0.1 to about 1 part by weight.

An average particle diameter (D50) of the lithium transition metal oxide utilized in the mechanical milling of the composite and the lithium transition metal oxide may be, for example, about 1 μm to about 20 μm, about 3 μm to about 15 μm, or about 5 μm to about 10 μm. An average particle diameter (D50) of the composite utilized in the mechanical milling of the composite and the lithium transition metal oxide may be, for example, about 50 nm to about 20 μm, about 50 nm to about 10 μm, about 50 nm to about 5 μm, about 50 nm to about 1 μm, about 50 nm to about 500 nm, about 50 nm to about 300 nm, or about 50 nm to about 250 nm.

The example embodiments will be described in more detail with examples and comparative examples. However, the following examples are for illustrative purpose only and shall not be construed as limiting the scope of the present disclosure.

Preparation of Composite

Reference Preparation Example 1: Undoped $Al_2O_3@Gr$ Composite $Al_2O_3$ particles (average particle diameter: about 20 nm) were disposed inside a reactor, and while supplying $CH_4$ at about 300 sccm (standard cubic centimeter per minute), and 1 atm for about 30 minutes, the temperature inside the reactor was raised to 1,000° C.

Subsequently, a heat-treatment was conducted while maintaining at the above temperature for 7 hours. Subsequently, the temperature inside the reactor was adjusted to room temperature (20-25° C.), to thereby obtain an undoped composite in which $Al_2O_3$ particles and its reduction product, $Al_2O_z$ ($0<z<3$) particles, are embedded.

An amount of alumina included in the undoped composite was 60 wt %.

Preparation Example 1: Fluorine (F)-Doped $Al_2O_3@Gr$ Composite 2.8 g of $NO_2BF_4$ (nitronium tetrafluoroborate) were dissolved in 100 mL of acetonitrile, and 0.13 g of the composite obtained in Reference Preparation Example 1 were dispersed therein, to thereby prepare a liquid dispersion. The prepared liquid dispersion was allowed to stand at room temperature for 4 weeks, and the composite was isolated and washed with acetonitrile, and then filtrated and dried. Fluorine (F) element was doped into the composite through a reaction between $NO_2BF_4$ and the composite.

Preparation of Composite Cathode Active Material

Example 1: Fluorine(F)-Doped $Al_2O_3@Gr$ Composite 0.4 wt % (Alumina 0.24 Wt %) Coating NCA91

$LiNi_{0.91}Co_{0.05}Al_{0.04}O_2$ (hereinafter, referred to as NCA91) and the composite prepared in Preparation Example 1 were milled for about 5-30 minutes utilizing a Nobilta mixer (Hosokawa, Japan) at about 1,000-2,000 rpm, to thereby produce a composite cathode active material.

A mixing weight ratio of NCA91 and the composite obtained according to Preparation Example 1 was 99.6:0.4.

Example 2: Fluorine (F)-Doped $Al_2O_3@Gr$ Composite 0.25 wt % Coating NCA91

A composite cathode active material was prepared in substantially the same process as Example 1, except that the mixing weight ratio of NCA91 and the composite obtained according to Preparation Example 1 was changed to 99.75:0.25.

Example 3: Fluorine (F)-Doped $Al_2O_3@Gr$ Composite 0.1 wt % Coating NCA91

A composite cathode active material was prepared in substantially the same process as Example 1, except that the mixing weight ratio of NCA91 and the composite obtained according to Preparation Example 1 was changed to 99.9:0.1.

Example 4: Fluorine (F)-Doped $Al_2O_3@Gr$ Composite 1.0 wt % Coating NCA91

A composite cathode active material was prepared in substantially the same process as Example 1, except that the mixing weight ratio of NCA91 and the composite obtained according to Preparation Example 1 was changed to 99.0:1.0.

Comparative Example 1: Bare NCA91

Bare NCA91 was utilized as a cathode active material.

Reference Example 1: Undoped $Al_2O_3$@Gr Composite 0.4 wt % Coating NCA91

A composite cathode active material was prepared in substantially the same process as Example 1, except that the undoped $Al_2O_3$@Gr composite prepared in Reference Preparation Example 1 was utilized instead of the F-doped $Al_2O_3$@Gr composite prepared in Preparation Example 1.

Preparation of Lithium Battery (Half-Cell)

Example 5

Preparation of Cathode

A mixture obtained by mixing the composite cathode active material prepared in Example 1, a carbon conductor (Denka Black), and polyvinylidene fluoride (PVdF) in a weight ratio of 96:2:2 was mixed with N-methylpyrrolidone (NMP) in an agate mortar to thereby prepare a slurry.

The slurry was bar-coated on an aluminum current collector having a thickness of 15 μm and dried at room temperature, and dried again under the conditions of vacuum and 120° C., and then rolled and punched, to thereby prepare a cathode plate having a thickness of 55 μm.

A loading level of the electrode was 10.5 mg/cm$^2$ and a mixture density of the electrode was 3.6 g/cc.

Preparation of Coin Cell

A coin cell was prepared utilizing the cathode plate prepared above, and utilizing lithium metal as a counter electrode, and utilizing, as an electrolyte, a solution in which a PTFE separator, 1.15 M LiPF$_6$, and vinylene carbonate (VC) 1.5 wt % were dissolved in EC (ethylene carbonate)+EMC (ethylmethylcarbonate)+DMC (dimethyl carbonate) (volume ratio of 2:4:4).

Examples 6 to 8

A coin cell was prepared in substantially the same process as described in Example 5, except that the composite cathode active materials prepared in Examples 2 to 4 were respectively utilized instead of the composite cathode active material prepared in Example 1.

Comparative Example 2

A coin cell was prepared in substantially the same process as described in Example 5, except that the composite cathode active materials prepared in Comparative Example 1 was utilized instead of the composite cathode active material prepared in Example 1.

Reference Example 2

A coin cell was prepared in substantially the same process as described in Example 5, except that the composite cathode active materials prepared in Reference Example 1 was utilized instead of the composite cathode active material prepared in Example 1.

Evaluation Example 1: XPS Spectrum Evaluation

During the process of preparing the undoped composite prepared in Reference Preparation Example 1, utilizing Quantum 2000 (Physical Electronics), an XPS spectrum over time was measured. XPS spectrums for C 1s orbital and Al 2p orbital of a sample were respectively measured before temperature elevation and at 1 minute point, 5 minutes point, 30 minutes point, 1 hour point, and 4 hours point of the temperature elevation. At the beginning of the time elevation, only the peak for Al 2p orbital appeared, and the peak for C 1s orbital did not appear. After 30 minutes, the peak for C 1s orbital clearly appeared, and the peak for Al 2p orbital significantly decreased in size.

After 30 minutes, the peak for C 1s orbital, attributed to C—C bonds and C=C bonds due to the growth of graphene clearly appeared around 284.5 eV.

As the reaction time elapses, due to a decrease in the oxidation number of aluminum, the peak position for Al 2p orbital shifted toward a lower binding energy (eV).

Accordingly, it could be confirmed that as the reaction progressed, graphene grew on $Al_2O_3$ particles, and $Al_2O$ (0<x<3), which is a reduction product of $Al_2O_3$, was formed.

Through the results of XPS analysis at 10 regions of the composite sample prepared in Reference Preparation Example 1, an average aluminum content (e.g., amount) and carbon was measured. With regards to the measurement results, a deviation in the amount of aluminum at the respective regions was calculated. The deviation in the aluminum content (e.g., amount) was expressed as a percentage with respect to an average value and is regarded as uniformity. Percentage with respect to an average value of the deviation in the aluminum content (e.g., amount), that is, uniformity of the aluminum content (e.g., amount), was 1%. Accordingly, it could be confirmed that alumina was substantially uniformly distributed in the composite prepared in Reference Preparation Example 1.

Evaluation Example 2: XPS Spectrum Evaluation

XPS spectrums for the undoped composite prepared in Reference Preparation Example 1 and the doped composite prepared in Preparation Example 1 are shown in FIG. 1.

As shown in FIG. 1, the doped composite prepared in Preparation Example 1 additionally showed a peak for fluorine (F) element, a peak for nitrogen (N) element, and a peak for boron (B) element.

Accordingly, it could be confirmed that the doped composite prepared in Preparation Example 1 was doped with fluorine (F) element.

In some embodiments, the undoped composite prepared in Reference Preparation Example 1 did not show a peak for fluorine (F) element, a peak for nitrogen (N) element, and a peak for boron (B) element.

The contents of the elements obtained from the XPS spectrums of the undoped composite prepared in Reference Preparation Example 1 and the doped composite prepared in Preparation Example 1 are shown in Table 1.

TABLE 1

| | Reference Preparation Example 1 [at %] | Preparation Example 1 [at %] |
|---|---|---|
| C 1s | 82.4 | 74.4 |
| O 1s | 9.7 | 9.6 |
| Al 2p | 7.9 | 4.9 |
| N 1s | — | 6.1 |
| F 1s | — | 4.2 |
| B 1s | — | 0.8 |

As can be seen in Table 1, the undoped composite prepared in Reference Preparation Example 1 did not contain (e.g., any) fluorine (F) element, nitrogen (N) element, and boron (B) element.

In some embodiments, the fluorine (F) element content (e.g., amount) of the fluorine (F)-doped composite prepared in Preparation Example 1 was 4.2 at %.

Evaluation Example 3: SEM, HR-TEM, and
SEM-EDAX Analyses

Scanning electron microscopy, high-resolution transmission electron microscopy, and EDAX analyses were conducted on the undoped composite prepared in Reference Preparation Example 1, the F-doped composite prepared in Preparation Example 1, the composite cathode active material prepared in Example 1, and the bare NCA91 of Comparative Example 1.

For SEM-EDAX analysis, FEI Titan 80-300 by Phillips Inc. was utilized.

The undoped composite prepared in Reference Preparation Example 1 was found to have a structure in which $Al_2O_3$ particles and its reduction product, $Al_2O_z$ ($0<z<3$) particles, are embedded in graphene. It was confirmed that a graphene layer was disposed on the outside of one or more particles selected from among $Al_2O_z$ ($0<z<3$) and $Al_2O_3$ particles. One or more particles selected from among $Al_2O_z$ ($0<z<3$) and $Al_2O_3$ particles were substantially uniformly dispersed in a graphene matrix. An average particle diameter of one or more selected from among $Al_2O_z$ ($0<z<3$) and $Al_2O_3$ particles was about 20 nm. An average particle diameter of the undoped composite prepared in Reference Preparation Example 1 was about 100 nm to 200 nm. The fluorine (F)-doped composite prepared in Preparation Example 1 showed a similar structure and average particle diameter as the composite prepared in Reference Preparation Example 1.

It was confirmed that in the composite cathode active material prepared in Example 1, a shell formed of a composite including fluorine (F)-doped graphene was disposed on the NCA91 core.

SEM-EDAX analyses were conducted on the bare NCA91 of Comparative Example 1 and the composite cathode active material prepared in Preparation Example 1.

It was confirmed that, compared to an aluminium (Al) concentration distributed on the surface of the bare NCA91 composite cathode active material of Comparative Example 1, the aluminum (Al) concentration distributed on the surface of the composite cathode active material of Example 1 had increased.

As a result, it was confirmed that the F-doped composite prepared in Preparation Example 1 was substantially uniformly coated, thereby forming a shell, on the NCA core of the composite cathode active material of Example 1.

Evaluation Example 4: Evaluation of
Room-Temperature (25° C.) Charge-Discharge
Characteristics The lithium batteries prepared in Examples 5 to 8, Comparative Example 2, and Reference Example 2 were charged at a constant current rate of 0.1 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.1 C until a voltage of 2.8 V (vs. Li) was reached during discharging (formation cycle).

The lithium batteries having undergone the formation cycle were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.2 C until a voltage of 2.8 V (vs. Li) was reached during discharging (1st cycle). The above cycle was repeated (50 times) under the same conditions up to the 50th cycle.

In all charge-discharge cycles, after each charge/discharge cycle, a rest period of 10 minutes was provided. A part of room-temperature charge-discharge test results is shown in Table 2. The initial efficiency was defined by Equation 1, and the capacity retention rate was defined by Equation 2.

$$\text{Initial Efficiency [\%]} = [\text{Discharge Capacity in Formation Cycle/Charge Capacity in Formation Cycle}] \times 100 \qquad \text{Equation 1}$$

$$\text{Capacity Retention Rate [\%]} = [\text{Discharge Capacity in 50th Cycle/Discharge Capacity in 1st Cycle}] \times 100 \qquad \text{Equation 2}$$

TABLE 2

| | Initial Efficiency [%] | Capacity Retention Rate [%] |
|---|---|---|
| Example 5: Fluorine (F)-doped $Al_2O_3$@Gr Composite 0.4 wt % coating/NCA91 Core | 90.4 | 91.8 |
| Comparative Example 2: Bare NCA91 (no coating) | 90.3 | 91.2 |
| Reference Example 2: Undoped $Al_2O_3$@Gr Composite 0.4 wt % coating/NCA91 Core | 90.5 | 91.2 |

As shown in Table 2, the lithium battery of Example 5 has improved initial efficiency compared to the lithium battery of Comparative Example 2.

The lithium batteries in Examples 5 to 8 have improved room-temperature lifetime characteristics compared to the lithium battery of Comparative Example 2.

Evaluation Example 5: Evaluation of
Room-Temperature High-Rate Characteristics

The lithium batteries prepared in Examples 5 to 8, Comparative Example 2, and Reference Example 2 were charged at a constant current rate of 0.1 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.1 C until a voltage of 2.8 V (vs. Li) was reached during discharging (formation cycle).

The lithium batteries having undergone the formation cycle were charged at a constant current rate of 0.2 C at 25°

C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.2 C until a voltage of 2.8 V (vs. Li) was reached during discharging (1st cycle).

The lithium batteries having undergone the 1st cycle were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.5 C until a voltage of 2.8 V (vs. Li) was reached during discharging (2nd cycle).

The lithium batteries having undergone the 2nd cycle were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 1.0 C until a voltage of 2.8 V (vs. Li) was reached during discharging (3rd cycle).

The lithium batteries having undergone the 3rd cycle were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 2.0 C until a voltage of 2.8 V (vs. Li) was reached during discharging (4th cycle).

The lithium batteries having undergone the 4th cycle were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 4.0 C until a voltage of 2.8 V (vs. Li) was reached during discharging (5th cycle).

In all charge-discharge cycles, after each charge/discharge cycle, a rest period of 10 minutes was provided. A part of room-temperature charge-discharge test results is shown in Table 3. High-rate characteristics is defined by Equation 3.

$$\text{High-Rate Characteristics [\%]=[4.0 C rate Discharge Capacity (5}^{th}\text{ Cycle Discharge Capacity)/0.2 C rate Discharge Capacity (1st Cycle Discharge Capacity)]×100} \qquad \text{Equation 3}$$

TABLE 3

| | 0.2 C Discharge Capacity (1$^{st}$ Cycle) [mAh/g] | 4.0 C Discharge Capacity (5th Cycle) [mAh/g] | High-Rate Characteristics [%] |
|---|---|---|---|
| Example 5: Fluorine (F)-doped Al$_2$O$_3$@Gr Composite 0.4 wt % coating/NCA91 Core | 208.4 | 191.3 | 95.6 |
| Comparative Example 2: Bare NCA91 (no coating) | 209.4 | 190.9 | 94.8 |
| Reference Example 2: Undoped Al$_2$O$_3$@Gr Composite 0.4 wt % coating/NCA91 Core | 209.1 | 190.7 | 95.4 |

As shown in Table 3, the lithium battery of Example 5 has improved high-rate characteristics compared to the lithium battery of Comparative Example 2.

Evaluation Example 6: Evaluation of High-Temperature (45° C.) Charge-Discharge Characteristics The lithium batteries prepared in Examples 5 to 8, Comparative Example 2, and Reference Example 2 were charged at a constant current rate of 0.2 C at 25° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.2 C until a voltage of 2.8 V (vs. Li) was reached during discharging (formation cycle).

The lithium batteries having undergone the formation cycle were charged at a constant current rate of 0.2 C at 45° C. until a voltage of 4.4 V (vs. Li) was reached, and then were cut-off at a current rate of 0.05 C while maintaining 4.4 V in a constant voltage mode. Subsequently, the lithium batteries were discharged at a constant current rate of 0.2 C until a voltage of 2.8 V (vs. Li) was reached during discharging (1st cycle). The above cycle was repeated (100 times) under the same conditions up to the 100th cycle.

In all charge-discharge cycles, after each charge/discharge cycle, a rest period of 10 minutes was provided. A part of high-temperature charge-discharge test results is shown in Table 4. The initial efficiency was defined by Equation 4, and the capacity retention rate was defined by Equation 5.

$$\text{Initial Efficiency [\%]=[Discharge Capacity in Formation Cycle/Charge Capacity in Formation Cycle]×100} \qquad \text{Equation 4}$$

$$\text{Capacity Retention Rate [\%]=[Discharge Capacity in 100th Cycle/Discharge Capacity in 1st Cycle]×100} \qquad \text{Equation 5}$$

TABLE 4

| | Initial efficiency [%] | High-temperature capacity Retention rate [%] |
|---|---|---|
| Example 5: Fluorine (F)-doped Al$_2$O$_3$@Gr Composite 0.4 wt % coating/NCA91 Core | 88.6 | 81.3 |
| Example 6: Fluorine (F)-doped Al$_2$O$_3$@Gr Composite 0.25 wt % coating/NCA91 Core | 88.2 | 74.6 |
| Example 7: Fluorine (F)-doped Al$_2$O$_3$@Gr Composite 0.1 wt % coating/NCA91 Core | 88.2 | 69.8 |
| Example 8: Fluorine (F)-doped Al$_2$O$_3$@Gr Composite 1.0 wt % coating/NCA91 Core | 88.4 | 80.1 |
| Comparative Example 2: Bare NCA91 (no coating) | 88.0 | 63.4 |
| Reference Example 2: Undoped Al$_2$O$_3$@Gr Composite 0.4 wt % coating/NCA91 Core | 88.4 | 79.3 |

As shown in Table 4, the lithium batteries of Examples 5 to 8 each have improved initial efficiency compared to the lithium battery of Comparative Example 2.

The lithium batteries in Examples 5 to 8 have significantly improved high-temperature lifetime characteristics compared to the lithium battery of Comparative Example 2.

Evaluation Example 7: Evaluation of Electrode Conductivity

Conductivities of the cathodes prepared in Example 5, Comparative Example 2, and Reference Example 2 were measured.

The conductivity of the cathode was measured utilizing XF057 PROBE UNIT by HIOKI Inc. Samples were prepared by punching a circle having a diameter of φ36 (36 mm) on the cathodes prepared in Example 5, Comparative Example 2, and Reference Example 2, and a thickness of an electrode active material layer was calculated by measuring a thickness of an electrode plate. A probe was placed on the electrode active material layer to measure resistance of a cathode, and conductivity of the cathode was calculated therefrom.

Measurement results are shown in Table 5.

TABLE 5

|  | Conductivity [S/m] |
| --- | --- |
| Example 5: Fluorine (F)-doped $Al_2O_3$@Gr Composite 0.4 wt % coating/NCA91 Core | 13.1 |
| Comparative Example 2: Bare NCA91 (no coating) | 11.4 |
| Reference Example 2: Undoped $Al_2O_3$@Gr Composite 0.4 wt % coating/NCA91 Core | 10.6 |

As can be seen in Table 5, the lithium battery of Reference Example 2, by having a shell incorporated therein, had shown a decreased electrode conductivity compared to the lithium battery of Comparative Example 2 that is shell-free.

In some embodiments, the lithium battery of Example 5, by having fluorine doped in the shell, had significantly improved electrode conductivity compared to the lithium battery of Comparative Example 2.

According to one aspect of an embodiment of the present disclosure, as the composite cathode active material includes the shell including doped fluorine (F) element, the carbonaceous material, and the first metal oxide, high-temperature lifetime characteristics and high-rate characteristics of the lithium battery may be improved.

The use of "may" when describing embodiments of the present disclosure refers to "one or more embodiments of the present disclosure."

As used herein, the term "substantially," "about," and similar terms are used as terms of approximation and not as terms of degree, and are intended to account for the inherent deviations in measured or calculated values that would be recognized by those of ordinary skill in the art. "About" or "approximately," as used herein, is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" may mean within one or more standard deviations, or within ±30%, 20%, 10%, 5% of the stated value.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this disclosure is intended to include all higher numerical limitations subsumed therein. Accordingly, Applicant reserves the right to amend this disclosure, including the claims, to expressly recite any sub-range subsumed within the ranges expressly recited herein.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the drawings, it will be understood by those of ordinary skill in the art that one or more suitable changes in form and details may be made therein without departing from the spirit and scope of the disclosure as defined by the following claims and equivalents thereof.

What is claimed is:

1. A composite cathode active material, comprising:
a core comprising a lithium transition metal oxide; and
a shell on and conforming to a surface of the core,
wherein the shell comprises:
at least one first metal oxide represented by formula $M_aO_b$, wherein $0<a\leq3$ and $0<b<4$, and if a is 1, 2, or 3, b is not an integer;
a carbonaceous material; and
a doped fluorine (F) element, and
wherein the first metal oxide is in a carbonaceous material matrix, and M is at least one metal selected from among Group 2 to Group 13, Group 15, and Group 16 metals in the Periodic Table.

2. The composite cathode active material of claim 1, wherein an amount of the doped fluorine (F) included in the shell is 1 at % to 10 at % with respect to a total number of atoms in the shell.

3. The composite cathode active material of claim 1, wherein an amount of the metal in the first metal oxide included in the shell is 1 at % to 10 at % with respect to a total number of atoms in the shell, an amount of oxygen included in the shell is 1 at % to 20 at % with respect to the total number of atoms in the shell, an amount of nitrogen included in the shell is 1 at % to 12 at % with respect to the total number of atoms in the shell, and an amount of boron included in the shell is more than 0 at % to 5 at % with respect to the total number of atoms in the shell.

4. The composite cathode active material of claim 1, wherein an amount of carbon included in the shell is 65 at % to 99 at % with respect to a total number of atoms in the shell.

5. The composite cathode active material of claim 1, wherein a metal included in the first metal oxide is at least one metal selected from among Al, Nb, Mg, Sc, Ti, Zr, V, W, Mn, Fe, Co, Pd, Cu, Ag, Zn, Sb, and Se.

6. The composite cathode active material of claim 1, wherein the first metal oxide is at least one selected from among $Al_2O_z$, wherein $0<z<3$, $NbO_x$, wherein $0<x<2.5$, $MgO_x$, wherein $0<x<1$, $Sc_2O_z$, wherein $0<z<3$, $TiO_y$, wherein $0<y<2$, $ZrO_y$, wherein $0<y<2$, $V_2O_z$, wherein $0<z<3$, $WO_y$, wherein $0<y<2$, $MnO_y$, wherein $0<y<2$, $Fe_2O_z$, wherein $0<z<3$, $Co_3O_w$, wherein $0<w<4$, $PdO_x$, wherein $0<x<1$, $CuO_x$, wherein $0<x<1$, $AgO_x$, wherein $0<x<1$, $ZnO_x$, wherein $0<x<1$, $Sb_2O_z$, wherein $0<z<3$, and $SeO_y$, wherein $0<y<2$.

7. The composite cathode active material of claim 1, wherein a thickness of the shell is 1 nm to 5 um.

8. The composite cathode active material of claim 1, wherein the carbonaceous material is graphene.

9. The composite cathode active material of claim 1, wherein the shell comprises at least one selected from a composite and a milling product of the composite, wherein the composite comprises the first metal oxide, the carbonaceous material, and the doped fluorine (F) element, and an amount of the at least one selected from the composite and the milling product of the composite is 3 wt % or less with respect to a total weight of the composite cathode active material.

10. The composite cathode active material of claim 9, wherein the carbonaceous material comprises a branched structure, the first metal oxide is distributed within the branched structure, and the branched structure comprises a plurality of carbonaceous material particles in contact with one another.

11. The composite cathode active material of claim 9, wherein the carbonaceous material has at least one structure selected from a spherical structure, a spiral structure in which a plurality of spherical structures are connected to each other, and a cluster structure in which a plurality of spherical structures are aggregated with each other, and wherein the first metal oxide is distributed within the spherical structure, the spherical structure has a size of 50 nm to 300 nm, the spiral structure has a size of 500 nm to 100 μm, the cluster structure has a size of 0.5 mm to 10 mm, the composite has a crumpled faceted-ball structure or a planar structure, at least one selected from among the first metal oxide and a second metal oxide is distributed within or on a surface of the crumpled faceted-ball structure or the planar structure, the carbonaceous material is extended from the first metal oxide by a distance of 10 nm or less and comprises at least 1 to 20 carbonaceous material layers, and a total thickness of the carbonaceous material is 0.6 nm to 12 nm.

12. The composite cathode active material of claim 1, wherein the lithium transition metal oxide is represented by one or more of Formulas 1 to 5:

$$Li_aNi_xCo_yM_zO_{2-b}A_b \qquad \text{Formula 1}$$

wherein in Formula 1, $0.9 \leq a \leq 1.2$, $0 \leq b \leq 0.2$, $0.8 \leq x < 1$, $0 \leq y \leq 0.3$, $0 < z \leq 0.3$, and $x+y+z=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or a combination thereof, and A is F, S, CI, Br, or a combination thereof, $$LiNi_xCo_yMn_zO_2 \qquad \text{Formula 2}$$

$$LiNi_xCo_yAl_zO_2 \qquad \text{Formula 3}$$

wherein in Formulas 2 to 3, $0.8 \leq x \leq 0.95$, $0 < y \leq 0.2$, $0 < z \leq 0.2$, and $x+y+z=1$, $$LiNi_xCo_yMn_yAl_wO_2 \qquad \text{Formula 4}$$

wherein in Formula 4, $0.8 \leq x \leq 0.95$, $0 < y \leq 0.2$, $0 < v \leq 0.2$, $0 < w \leq 0.2$, and $x+y+v+w=1$, $$Li_aCo_xM_yO_{2-b}A_b \qquad \text{Formula 5}$$

wherein in Formula 5, $1.0 \leq a \leq 1.2$, $0 \leq b \leq 0.2$, $0.9 \leq x \leq 1$, $0 \leq y \leq 0.1$, and $x+y=1$, M is manganese (Mn), niobium (Nb), vanadium (V), magnesium (Mg), gallium (Ga), silicon (Si), tungsten (W), molybdenum (Mo), iron (Fe), chromium (Cr), copper (Cu), zinc (Zn), titanium (Ti), aluminum (Al), or a combination thereof, and A is F, S, CI, Br, or a combination thereof.

13. A cathode comprising the composite cathode active material according to claim 1.

14. A lithium battery comprising:
the cathode of claim 13;
an anode; and
an electrolyte between the cathode and the anode.

* * * * *